US012578762B2

(12) United States Patent　　　(10) Patent No.:　US 12,578,762 B2
Kim et al.　　　　　　　　　　　　(45) Date of Patent:　　Mar. 17, 2026

(54) ELECTRONIC DEVICE INCLUDING SLIDING STRUCTURE AND FLEXIBLE DISPLAY WITH AUDIO DATA ADJUSTMENT

(71) Applicant: Samsung Electronics Co., Ltd., Suwon-si (KR)

(72) Inventors: Dahee Kim, Suwon-si (KR); Hyunggwang Kang, Suwon-si (KR); Daehyun Kim, Suwon-si (KR); Taeyeong Kim, Suwon-si (KR); Sangeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 373 days.

(21) Appl. No.: 18/181,991

(22) Filed: Mar. 10, 2023

(65) Prior Publication Data

US 2023/0213978 A1　　Jul. 6, 2023

Related U.S. Application Data

(63) Continuation of application No. PCT/KR2021/012896, filed on Sep. 17, 2021.

(30) Foreign Application Priority Data

Oct. 19, 2020　(KR) ........................ 10-2020-0135002

(51) Int. Cl.
　*G06T 3/40*　　　(2024.01)
　*G06F 1/16*　　　(2006.01)
　*G06F 3/16*　　　(2006.01)
(52) U.S. Cl.
　CPC .......... *G06F 1/1652* (2013.01); *G06F 1/1624* (2013.01); *G06F 3/165* (2013.01); *G06T 3/40* (2013.01)

(58) Field of Classification Search
　CPC ...... G06F 1/1652; G06F 1/1624; G06F 3/165; G06F 1/1688; G06F 1/1677; G06F 3/162;
　　　　　　　　(Continued)

(56) References Cited

U.S. PATENT DOCUMENTS 9,743,033 B2　　8/2017　Kim et al.
10,656,900 B2　　5/2020　Katsumata et al.
　　　　　　　　(Continued)

FOREIGN PATENT DOCUMENTS

JP　　　2018-517984 A　　7/2018
KR　　10-2014-0096747 A　　8/2014
　　　　　　　　(Continued)

OTHER PUBLICATIONS

Ariel Ephrat et al., Looking to Listen at the Cocktail Party: A Speaker-Independent Audio-Visual Model for Speech Separation, ACM Trans. Graph., vol. 37, No. 4, Article 109. Aug. 2018.
　　　　　　　　(Continued)

*Primary Examiner* — Alison Slater
(74) *Attorney, Agent, or Firm* — Jefferson IP Law, LLP

(57)　　　　　　ABSTRACT

An electronic device is provided. The electronic device includes a housing, a flexible display including a sliding plate and a bendable section coupled to the sliding plate, a speaker, a sensor for detecting a first state in which a portion of the bendable section is inserted into an inner space of the housing or a second state in which the portion of the bendable section is withdrawn to an outer space of the housing, and a processor communicatively coupled to memory, the flexible display, the speaker, and the sensor, and being configured to identify an object outputting sound among displayed objects, and in response to identifying the object, display part of the image including the object and adjust an output of at least a portion of audio data based on
　　　　　　　　(Continued)

a degree to which the portion of the bendable section is retracted into the inner space.

13 Claims, 18 Drawing Sheets

(58) Field of Classification Search
    CPC ....... G06T 3/40; H04M 1/02; H04M 1/72448; H04M 1/725; H04M 1/0237; H04M 1/0268; H04R 2499/11
    See application file for complete search history.

(56)　　　　　　　References Cited

U.S. PATENT DOCUMENTS

| | | |
|---|---|---|
| 10,684,754 B2 | 6/2020 | Lee et al. |
| 11,431,887 B2 | 8/2022 | Takahashi |
| 2013/0154971 A1 | 6/2013 | Kang et al. |
| 2014/0218375 A1 | 8/2014 | Kim |
| 2016/0170709 A1 | 6/2016 | Jang et al. |
| 2017/0212607 A1 | 7/2017 | Yoon |
| 2018/0173393 A1 | 6/2018 | Verdier et al. |
| 2018/0210697 A1* | 7/2018 | Rakshit ................ G11B 27/031 |
| 2019/0018636 A1* | 1/2019 | Kong ................... G06F 1/1624 |
| 2019/0394423 A1 | 12/2019 | Ishige |
| 2020/0137506 A1* | 4/2020 | Lee .......................... H04S 1/007 |
| 2021/0034210 A1* | 2/2021 | Chung .................. G06F 3/0488 |
| 2021/0219089 A1* | 7/2021 | Sim .......................... H04S 7/306 |

FOREIGN PATENT DOCUMENTS

| | | | |
|---|---|---|---|
| KR | 10-2016-0071785 | A | 6/2016 |
| KR | 10-2017-0008610 | A | 1/2017 |
| KR | 10-2017-0048007 | A | 5/2017 |
| KR | 10-2017-0089664 | A | 8/2017 |
| KR | 10-2017-0099088 | A | 8/2017 |
| KR | 10-1864185 | B1 | 6/2018 |
| KR | 10-2019-0098340 | A | 8/2019 |
| KR | 10-2020-0014056 | A | 2/2020 |
| WO | 2020/022055 | A1 | 1/2020 |

OTHER PUBLICATIONS

Rongzhi Gu et al., Multi-modal Multi-channel Target Speech Separation, IEEE Journal of Selected Topics in Signal Processing, Mar. 2020.

Triantafyllos Afouras et al., The Conversation: Deep Audio-Visual Speech Enhancement, Visual Geometry Group, Department of Engineering Science, University of Oxford, UK, Jun. 19, 2018.

Hang Zhao et al., The Sound of Pixels, Proceedings of the European Conference on Computer Vision (ECCV), 2018.

International Search Report dated Dec. 30, 2021, issued in International Application No. PCT/KR2021/012896.

Korean Office Action dated May 28, 2025, issued in Korean Application No. 10-2020-0135002.

* cited by examiner

START

DETECT OBJECT IN IMAGE — 810

EXTRACT AND CLASSIFY SOUNDS CORRESPONDING TO OBJECTS IN AUDIO DATA OF CONTENT — 820

STORE DATA MADE BY MAPPING OBJECTS AND SOUNDS — 830

END 901 903

911       913       917       915

941    943

ELECTRONIC DEVICE INCLUDING SLIDING STRUCTURE AND FLEXIBLE DISPLAY WITH AUDIO DATA ADJUSTMENT

CROSS-REFERENCE TO RELATED APPLICATION(S)

This application is a continuation application, claiming priority under § 365 (c), of an International application No. PCT/KR2021/012896, filed on Sep. 17, 2021, which is based on and claims the benefit of a Korean patent application number 10-2020-0135002, filed on Oct. 19, 2020, in the Korean Intellectual Property Office, the disclosure of which is incorporated by reference herein in its entirety.

BACKGROUND

1. Field

The disclosure relates to an electronic device and a method of operating an electronic device. More particularly, the disclosure relates to a technology for outputting content on the basis of a state of a display.

2. Description of Related Art

Various electronic devices such as smartphones, tablet personal computers (PCs), portable multimedia players (PMPs), personal digital assistants (PDAs), laptop personal computers (PCs), or wearable devices are widely used.

Recently, the electronic device has been implemented by using form factors to provide a relatively large screen while having a size that allows a user to grip the electronic device without feeling discomfort. Among the form factors for the electronic device, a slidable form factor has been developed as a next-generation form factor because the slidable form factor may expand a display in a sliding manner.

The sliding manner may include a slide-in manner in which a part of a flexible display is retracted into an internal space of an electronic device or a slide-out manner in which a part of the flexible display is extended from the internal space of the electronic device.

The electronic device implemented by the slidable form factor may have a relatively small size as the flexible display is slid into the electronic device in a state in which a user carries the electronic device. In the slide-out state, the flexible display is slid out of the electronic device, such that the content may be outputted through a relatively large screen.

The above information is presented as background information only to assist with an understanding of the disclosure. No determination has been made, and no assertion is made, as to whether any of the above might be applicable as prior art with regard to the disclosure.

SUMMARY

The display of the electronic device may switch to a slide-in state from a slide-out state in which content is displayed. A size of an area, which may be displayed in the slide-in state, may be smaller than a size of an area that may be displayed in the slide-out state. In this case, the electronic device may display the content by reducing a size of the content while maintaining an aspect ratio of the content displayed in the slide-out state.

In case that the content with the reduced size is displayed in the slide-in state, the size of the content may be decreased, and visibility of the content may be decreased.

Further, in case that only the size of the content is decreased in a state in which an aspect ratio of the content is maintained, a marginal area (e.g., a pillar box or a letter box) may be produced, and usability of the user, who watches the content, may deteriorate.

Aspects of the disclosure are to address at least the above-mentioned problems and/or disadvantages and to provide at least the advantages described below. Accordingly, an aspect of the disclosure is to provide an electronic device that has a display area having a size that varies depending on a state (e.g., a slide-in or slide-out state) of the electronic device, and the electronic device may provide content in consideration of the display area having the size that varies depending on the state of the electronic device.

Technical problems to be solved by the disclosure are not limited to the above-mentioned technical problems, and other technical problems, which are not mentioned above, may be clearly understood from the following descriptions by those skilled in the art to which the disclosure pertains.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a flexible display including a sliding plate capable of sliding out of the housing, and a bendable section extendable from an internal space of the housing coupled to the sliding plate while overlapping the sliding plate, a speaker, a sensor configured to detect a first state in which at least a part of the bendable section is retracted into the internal space of the housing by slide-in of the sliding plate or a second state in which at least a part of the bendable section is extended to an external space of the housing by slide-out of the sliding plate, and a processor operatively connected to the sensor, wherein the processor is configured to control the flexible display and the speaker to output content including images including one or more objects and audio data, control the flexible display to display at least a part of the image including the object based on a degree to which at least a part of the bendable section is retracted into the internal space of the housing in response to detection of a state in which the first state is detected by the sensor, and adjust an output of at least some of the audio data based on the degree to which at least a part of the bendable section is retracted into the internal space of the housing.

In accordance with another aspect of the disclosure, a method of operating an electronic device is provided. The method includes outputting content including images including one or more objects and audio data, displaying at least a part of the image including the object based on a degree to which at least a part of a bendable section is retracted into an internal space of a housing in response to a state in which a change from a second state to a first state is detected by a sensor that detects the first state in which at least a part of the bendable section of a display is retracted into the internal space of the housing or the second state in which at least a part of the bendable section is extended to an external space of the housing, and adjusting an output of at least a portion of the audio data based on the degree to which at least a part of the bendable section is retracted into the internal space of the housing.

The electronic device and the method of operating the electronic device according to various embodiments may identify the object included in the image of the content and crop (or extract) the partial area of the image so that the object is included when the electronic device switches to the slide-in state. The electronic device may display the extracted partial area on the display, thereby displaying an important part of the content without a marginal area. Therefore, it is possible to increase the degree of immersion in watching the content.

The electronic device and the method of operating the electronic device according to various embodiments may output only the sound, which corresponds to the object in the displayed image, through the speaker when the electronic device switches to the slide-in state (or the slide-out state). Therefore, it is possible to increase the degree of immersion in watching the content.

The electronic device and the method of operating the electronic device according to various embodiments may adjust the output of some of the audio data excluding the sounds corresponding to the objects in the displayed image on the basis of the degree to which the bendable section of the display is retracted (or extended) when the electronic device switches to the slide-in state (or the slide-out state). Therefore, it is possible to increase the degree of immersion in watching the content.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a block diagram of an electronic device according to an embodiment of the disclosure;

Throughout the drawings, it should be noted that like reference numbers are used to depict the same or similar elements, features, and structures.

DETAILED DESCRIPTION

Figure 2:
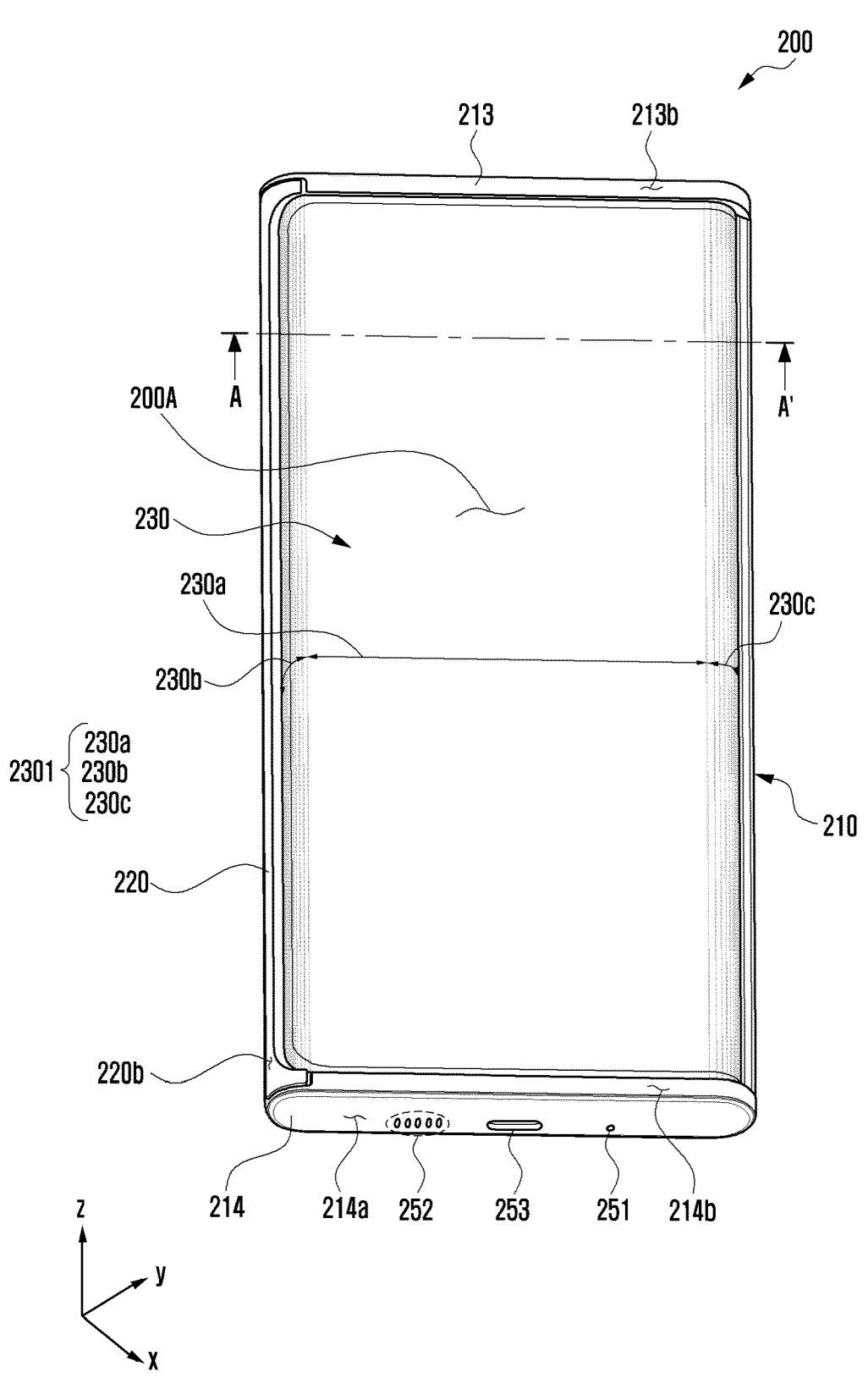
FIG. 2 is a front perspective view illustrating the electronic device in a first state (e.g., a closed state) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
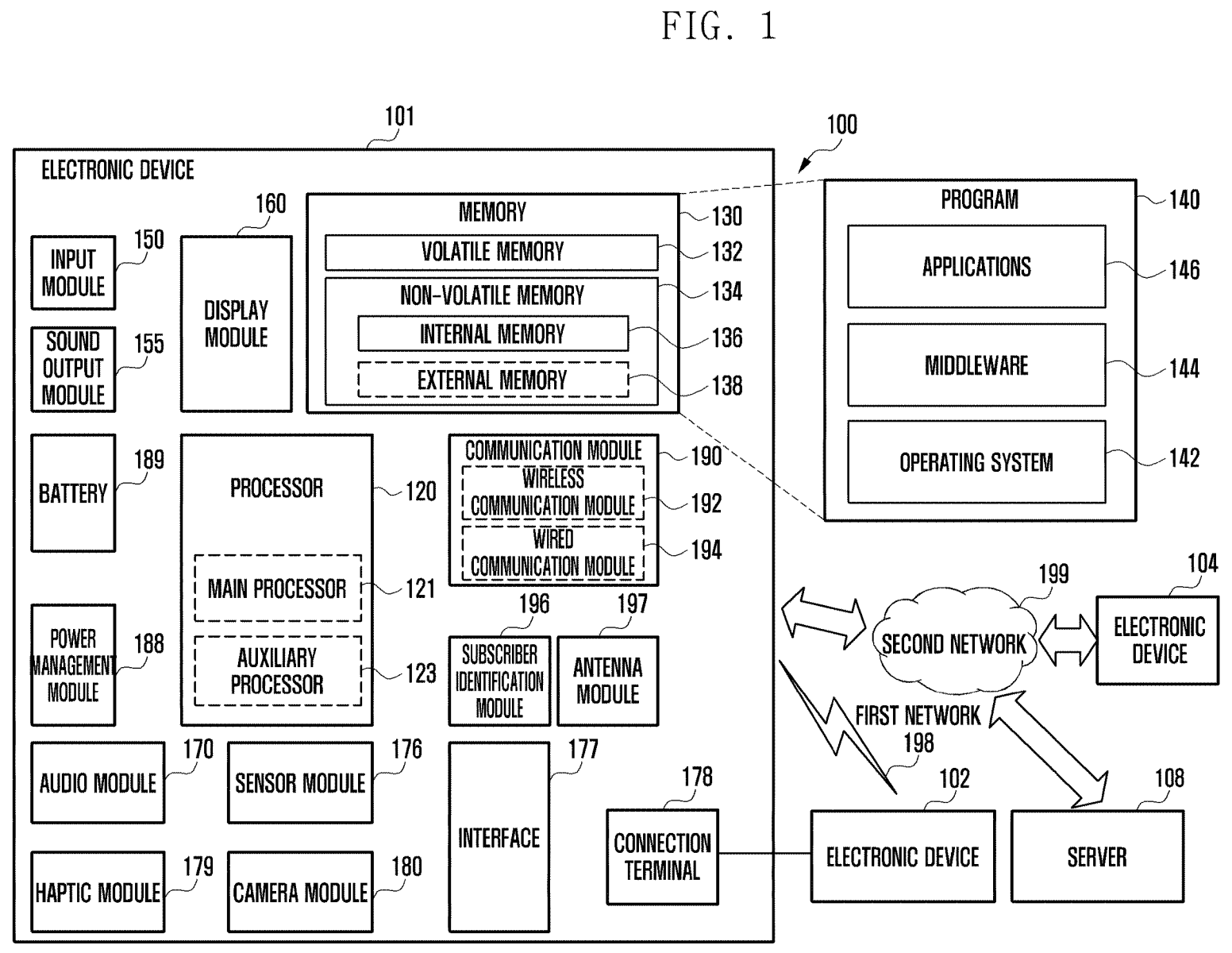

FIG. 1 is a block diagram illustrating an electronic device 101 in a network environment 100 according to an embodiment of the disclosure. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 3:
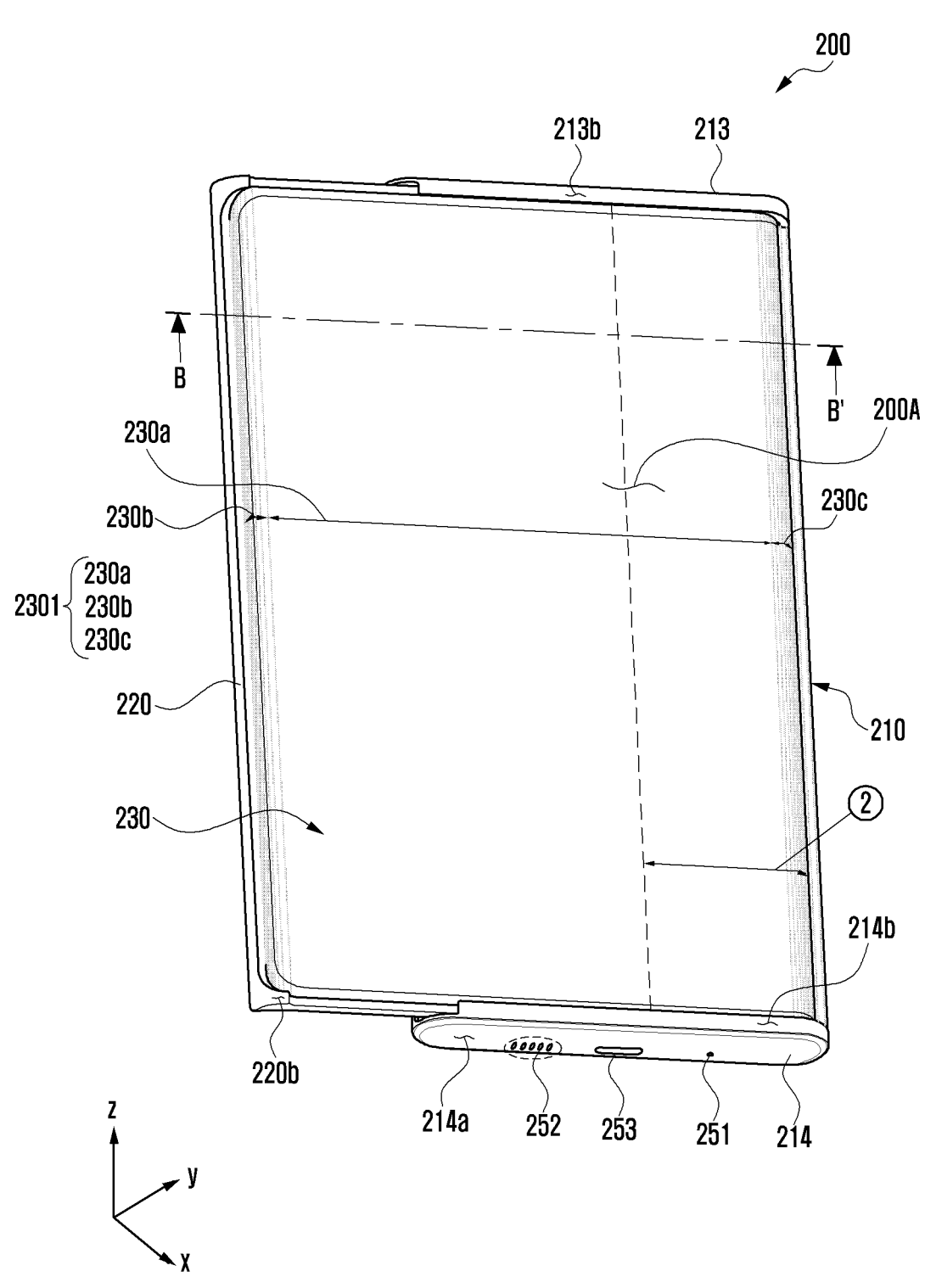
FIG. 3 is a front perspective view illustrating the electronic device in a second state (e.g., an open state) according to an embodiment of the disclosure.

FIG. 2 is a front perspective view illustrating the electronic device in a first state (e.g., a closed state) according to an embodiment of the disclosure. FIG. 3 is a front perspective view illustrating the electronic device in a second state (e.g., an open state) according to an embodiment of the disclosure.

According to various embodiments, an electronic device 200 in FIGS. 2 and 3 may include the electronic device 101 in FIG. 1.

Referring to FIGS. 2 and 3, the electronic device 200 may be implemented to expand a screen 2301 in a sliding manner. For example, the screen 2301 may include an area of a flexible display 230 that is visible to the outside.

In the embodiment, FIG. 2 illustrates the electronic device 200 in a state in which the screen 2301 is not expanded, and FIG. 3 illustrates the electronic device 200 in a state in which the screen 2301 is expanded. Hereinafter, the state in which the screen 2301 is not expanded is referred to as "a first state, e.g., a closed state" in which a sliding plate 220 for allowing a sliding motion of the flexible display 230 is not slid out. Hereinafter, the state in which the screen 2301 is expanded may be referred to as "a second state, e.g., an open state" in which the screen 2301 is maximally expanded, and the screen 2301 is not expanded any further by the sliding-out of the sliding plate 220.

In the embodiment, the first state may be called a first shape, and the second state may be called a second shape. For example, the first shape may include a basic (normal) state, a retracted state, a closed state, or a slide-in state. The second shape may include an expanded (extended) state, an open state, or a slide-out state. In addition, in the embodiment, the electronic device 200 may define a third state that is a state between the first state and the second state. For example, the third state may be called a third shape. The third shape may include a free-stop state that is a state in which a part of the sliding plate 220 is expanded.

In the embodiment, the slide-out may mean that the sliding plate 220 at least partially moves in a first direction (e.g., a −x-axis direction) when the electronic device 200 switches from the closed state to the open state. The open state may be defined as a state in which the screen 2301 is expanded in comparison with the closed state. The open state may provide the screen 2301 having a size that varies depending on a movement position of the sliding plate 220.

In various embodiments, states of the electronic device 200 may include a third state, e.g., an intermediate state. The intermediate state may mean a state between the closed state in FIG. 2 and the open state in FIG. 3. The screen 2301 may include an active area of the flexible display 230 that is visually exposed and may output an image. The electronic device 200 may adjust the active area in accordance with a movement of the sliding plate 220 or a movement of the flexible display 230. In the following description, the open state may refer to the state in which the screen 2301 is maximally expanded. In various embodiments, the flexible display 230, which is slidably disposed on the electronic device 200 in FIG. 2 and provides the screen 2301, may be referred to as a "slide-out display" or an "expandable display".

In the embodiment, the electronic device 200 may include a sliding structure related to the flexible display 230. For example, when the flexible display 230 is moved to a predetermined distance by an external force, an elastic structure included in the sliding structure may switch from the closed state to the open state or from the open state to the closed state (e.g., may semiautomatically slide) without an additional external force.

In another embodiment, when an input device included in the electronic device 200 generates a signal, a drive device, such as a motor, connected to the flexible display 230 may switch the state of the electronic device 200 from the closed state to the open state or from the open state to the closed state. For example, when a signal is generated by a hardware button or a software button provided through the screen, the electronic device 200 may switch from the closed state to the open state or from the open state to the closed state.

In still another embodiment, when a signal is generated from various sensors such as a pressure sensor, the electronic device 200 may switch from the closed state to the open state or from the open state to the closed state. For example, a sensor may detect a squeeze gesture when a part of a user's hand (e.g., palm or finger) presses a designated section of the electronic device 200 when the user carries or grips the electronic device 200, and the electronic device 200 switches from the closed state to the open state or from the open state to the closed state in response to the squeeze gesture.

In the embodiment, the flexible display 230 may include a bendable section ②(see FIG. 3). The bendable section ② may include a portion of the screen 2301 that is expanded when the electronic device 200 switches from the closed state to the open state. When the electronic device 200 switches from the closed state to the open state, the bendable section ② may be extended from an internal space of the electronic device 200 while sliding, such that the screen 2301 may be expanded. When the electronic device 200 switches from the open state to the closed state, at least a part of the bendable section ② may be retracted into the internal space of the electronic device 200 while sliding, such that the screen 2301 may be contracted. When the electronic device 200 switches from the open state to the closed state, at least a part of the bendable section ② may be moved to the internal space of the electronic device 200 while being curved. For example, the flexible display 230 may include a flexible substrate (e.g., plastic substrate) made of a polymer material containing polyimide (PI) or polyester (PET).

In the embodiment, the electronic device 200 may include a housing 210, the sliding plate 220, and/or the flexible display 230.

In the embodiment, the housing (or casing) 210 may include a back cover (not illustrated), a first side cover 213, or a second side cover 214. The back cover (not illustrated), the first side cover 213, or the second side cover 214 may be connected to a support member (not illustrated) positioned in the electronic device 200 and define at least a part of an external appearance of the electronic device 200.

In the embodiment, the back cover (not illustrated) may define at least a part of a rear surface (not illustrated) of the electronic device 200. In the embodiment, the back cover (not illustrated) may be substantially opaque. For example, the back cover (not illustrated) may be formed by coated or colored glass, ceramic, polymer, metal (e.g., aluminum, stainless steel (STS), or magnesium), or a combination of at least two of the above-mentioned materials. In the embodiment, at least a part of the bendable section ②may also be disposed to be visible from the outside through the back cover (not illustrated) in the state (e.g., the closed state) in which the bendable section ②of the flexible display 230 is retracted into the internal space of the housing 210. In this case, the back cover (not illustrated) may be made of a transparent material and/or a semi-transparent material.

In the embodiment, the first side cover 213 and the second side cover 214 may be positioned opposite to each other. For example, the first side cover 213 and the second side cover 214 may be positioned opposite to each other with the flexible display 230 interposed therebetween in a second direction (e.g., a y-axis direction) orthogonal to the first direction (e.g., the –x-axis direction) of slide-out of the sliding plate 220. The first side cover 213 may define at least a part of a first side surface (not illustrated) of the electronic device 200, and the second side cover 214 may define at least a part of a second side surface 214a of the electronic device 200 that is directed in a direction opposite to the first side surface (not illustrated). The first side cover 213 may include a first rim portion 213b extending from an edge of the first side surface (not illustrated). For example, the first rim portion 213b may define at least a part of one side bezel of the electronic device 200. The second side cover 214 may include a second rim portion 214b extending from an edge of the second side surface 214a. For example, the second rim portion 214b may define at least a part of the other side bezel of the electronic device 200. In the embodiment, in the closed state in FIG. 2, a surface of the first rim portion 213b, a surface of the second rim portion 214b, and a surface of the sliding plate 220 may be smoothly connected, thereby defining one side curved portion (not illustrated) corresponding to a first curved portion 230b of the screen 2301. In the embodiment, the surface of the first rim portion 213b or the surface of the second rim portion 214b may include the other side curved portion (not illustrated) corresponding to a second curved portion 230c of the screen 2301 positioned opposite to the first curved portion 230b.

In the embodiment, the sliding plate 220 may perform a sliding motion on a support member (not illustrated) positioned in the electronic device 200. At least a part of the flexible display 230 may be disposed on the sliding plate 220. The closed state in FIG. 2 or the open state in FIG. 3 may be implemented on the basis of a position of the sliding plate 220 on the support member (not illustrated). In the embodiment, the flexible display 230 may be attached to the sliding plate 220 by means of a bonding member (not illustrated). In the embodiment, the bonding member may include a thermally reactive bonding member, a photoreactive bonding member, a general bonding agent, and/or a double-sided tape. In another embodiment, the flexible display 230 may be disposed on and fixed to the sliding plate 220 by being inserted into a recess formed in the sliding plate 220 in a sliding manner. The sliding plate 220 may serve to support at least a part of the flexible display 230 and also be referred to as a display support structure.

In the embodiment, the sliding plate 220 may include a third rim portion 220b that defines an outer surface of the electronic device 200 (e.g., a surface that is exposed to the outside and defines an external appearance of the electronic device 200). For example, the third rim portion 220b, together with the first rim portion 213b and the second rim portion 214b, defines a bezel at the periphery of the screen 2301 in the closed state in FIG. 2. In the closed state, the third rim portion 220b may extend in the second direction (e.g., the y-axis direction) to connect one end of the first side cover 213 and one end of the second side cover 214. For example, in the closed state in FIG. 2, a surface of the third rim portion 220b may be smoothly connected to a surface of the first rim portion 213b and/or a surface of the second rim portion 214b.

In the embodiment, when the sliding plate 220 slides out, at least a part of the bendable section ②may be extended from the interior of the electronic device 200, such that the state (e.g., the open state) in which the screen 2301 is expanded may be provided, as illustrated in FIG. 3.

In the embodiment, in the closed state in FIG. 2, the screen 2301 may include a planar portion 230a, and the first curved portion 230b and/or the second curved portion 230c positioned opposite to each other with the planar portion 230a interposed therebetween. For example, the first curved portion 230b and the second curved portion 230c may be substantially symmetric with the planar portion 230a interposed therebetween. In the embodiment, when the state is changed from the closed state in FIG. 2 to the open state in FIG. 3, the planar portion 230a may be expanded. For example, a partial area of the bendable section ②, which defines the second curved portion 230c in the closed state in FIG. 2, may be formed as another area of the bendable section ②and included in the planar portion 230a that is expanded when the state is changed from the closed state in FIG. 2 to the open state in FIG. 3.

In the embodiment, the electronic device 200 may include an opening (not illustrated) through which the bendable section ②is retracted or extended, and/or a pulley (not illustrated) positioned in the opening (not illustrated). The pulley (not illustrated) may be positioned to correspond to the bendable section ②. When the state changes between the closed state in FIG. 2 and the open state in FIG. 3, the movement of the bendable section ②and the movement direction of the bendable section ②may be guided by the rotation of the pulley (not illustrated). The first curved portion 230b may be formed to correspond to a curved surface formed on one surface of the sliding plate 220. The second curved portion 230c may be defined by a portion of the bendable section ②that corresponds to a curved surface of the pulley (not illustrated). The second curved portion 230c may be positioned opposite to the first curved portion 230b in the closed state or the open state of the electronic device 200 and improve an aesthetic appearance of the screen 2301. In another embodiment, the planar portion 230a of the electronic device 200 may be implemented to be expanded without the first curved portion 230b.

In the embodiment, the flexible display 230 may further include a touch detection circuit (e.g., a touch sensor). Although not illustrated, in various embodiments, the flexible display 230 may be coupled to or disposed adjacent to a pressure sensor configured to measure intensity (pressure) of touch and/or a digitizer configured to detect a pen input device (e.g., a stylus pen) that operates in a magnetic field manner. For example, the digitizer may include a coil member disposed on a dielectric substrate to detect an electromagnetic induction resonant frequency applied from the pen input device.

In the embodiment, the electronic device 200 may include a microphone hole 251 (e.g., the input module 150 in FIG. 1), a speaker hole 252 (e.g., the sound output module 155 in FIG. 1), and/or a connector hole 253 (e.g., the connection terminal 178 in FIG. 1). In any embodiment, the electronic device 200 may exclude at least one of the constituent elements or further include other constituent elements.

In the embodiment, the microphone hole 251 may be formed in at least a part of the second side surface 214a and correspond to a microphone (not illustrated) positioned in the electronic device 200. A position of the microphone hole 251 may be variously configured without being limited to the embodiment in FIG. 2. In the embodiment, the electronic device 200 may include a plurality of microphones capable of detecting a direction of sound.

In the embodiment, the speaker hole 252 may be formed in at least a part of the second side surface 214*a* and correspond to a speaker (not illustrated) positioned in the electronic device 200. A position of the speaker hole 252 may be variously configured without being limited to the embodiment in FIG. 2. In various embodiments, the electronic device 200 may include a telephone receiver hole. In any embodiment, the microphone hole 251 and the speaker hole 252 may be implemented as a single hole. Alternatively, the speaker hole 252 may be eliminated like a piezoelectric speaker.

In the embodiment, the connector hole 253 may be formed in at least a part of the second side surface 214*a* and correspond to a connector (e.g., a USB connector) positioned in the electronic device 200. The electronic device 200 may transmit and/or receive electric power and/or data to and/or from an external electronic device electrically to the connector through the connector hole 253. A position of the connector hole 253 may be variously configured without being limited to the embodiment in FIG. 2.

Although not illustrated, in various embodiments, the electronic device 200 may further include a camera module (e.g., a front camera) configured to produce an image signal on the basis of light received through one surface (e.g., the front surface 200A) of the electronic device 200 placed in a direction in which the screen 2301 is directed. For example, the camera module (e.g., the front camera) (not illustrated) may be aligned with an opening (e.g., a through-hole or a notch) formed in the flexible display 230, and the camera module may be positioned in the housing 210. The camera module (e.g., the front camera) (not illustrated) may produce an image signal by receiving light through the opening and a partial area of a transparent cover that overlaps the opening. The transparent cover may serve to protect the flexible display 230 from the outside. For example, the transparent cover may be made of a material such as polyimide or ultra-thin glass (UTG).

In various embodiments, the camera module (e.g., the front camera) (not illustrated) may be disposed at a lower end of at least a part of the screen 2301 of the flexible display 230. The camera module may perform the relevant function (e.g., a function of capturing an image) in a state in which a position of the camera module (e.g., the front camera) (not illustrated) is not visually distinguished (or exposed). In this case, the camera module (e.g., the front camera) (not illustrated) is disposed to overlap at least a part of the screen 2301 when viewed from above the screen 2301, such that the camera module may acquire an image of an external object without being exposed to the outside.

Although not illustrated, in various embodiments, the electronic device 200 may further include a key input device (e.g., the input module 150 in FIG. 1). The key input device may be positioned on the first side surface (not illustrated) of the electronic device 200 defined by the first side cover 213. In various embodiments, the key input device may include at least one sensor module.

Although not illustrated, in various embodiments, the electronic device 200 may include various sensor modules (e.g., the sensor module 176 in FIG. 1). The sensor module may generate electrical signals or data values corresponding to an internal operating state of the electronic device 200 or an external environment state. For example, the sensor module may include a proximity sensor configured to generate a signal related to an approach of an external object on the basis of light received through the front surface 200A of the electronic device 200 placed in the direction in which the screen 2301 is directed. In another example, the sensor module may include various biosensors such as a fingerprint sensor or an HRM sensor that detects information on a living body on the basis of light received through the front surface 200A or the rear surface (not illustrated) of the electronic device 200. The electronic device 200 may include at least one of various other sensor modules, e.g., a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, and an illuminance sensor.

Figure 4:
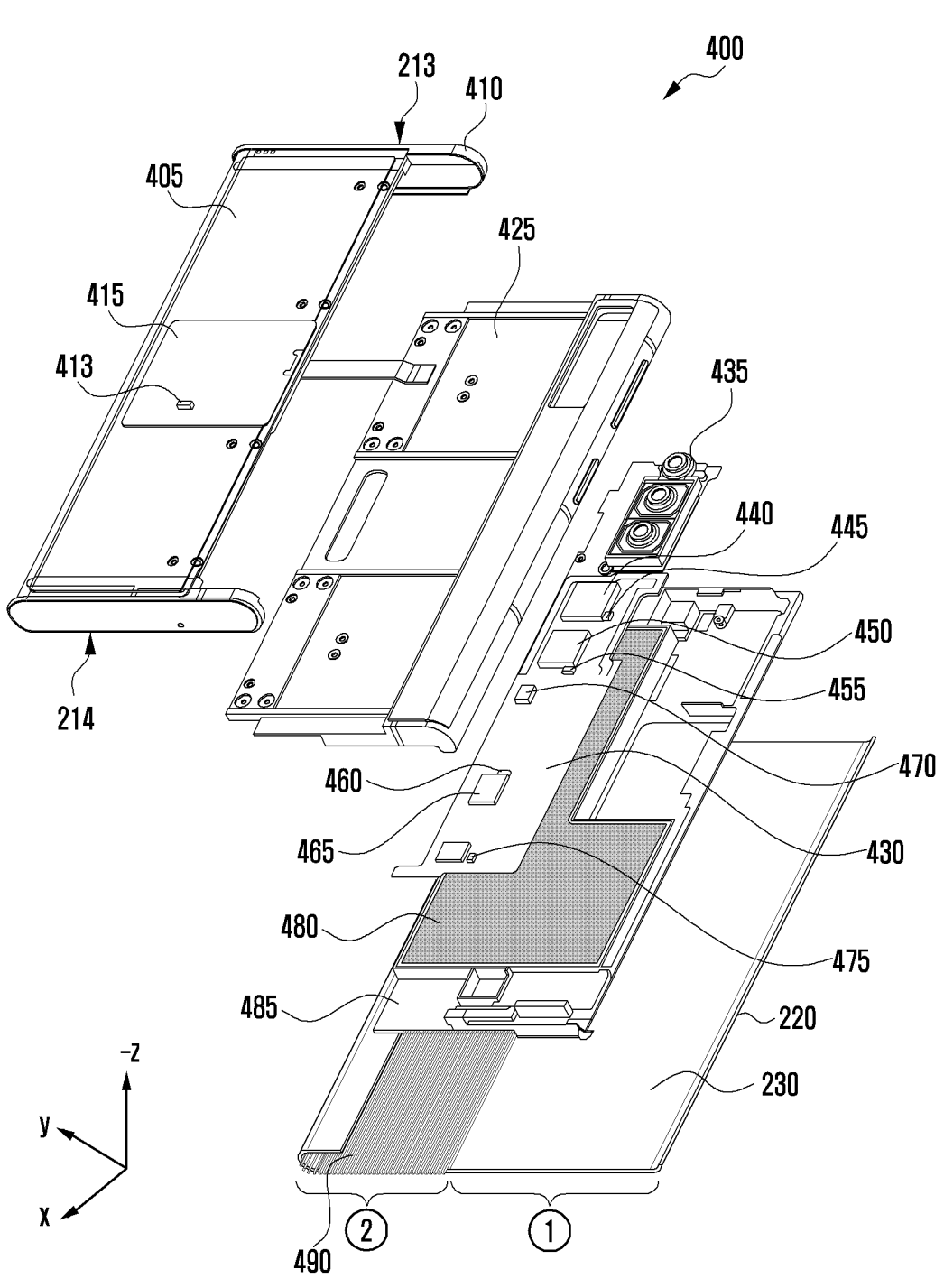
FIG. 4 is a deployed perspective view illustrating the electronic device in FIG. 2 according to an embodiment of the disclosure.

FIG. 4 is a deployed perspective view 400 illustrating the electronic device in FIG. 2 according to an embodiment of the disclosure.

Referring to FIG. 4, the electronic device 200 may include the back cover (not illustrated), the first side cover 213, the second side cover 214, a first support member 485, a second support member 425, a third support member 405, the sliding plate 220, the flexible display 230, a printed circuit board 430 (e.g., a PCB), a flexible PCB (FPCB), a rigid-flexible PCB (RFPCB), and/or a multi-bar structure (or a multi-bar assembly) 490. A repeated description of reference numerals in FIG. 4 identical to those in FIGS. 2 and 3 will be omitted.

In the embodiment, the first support member 485, the second support member 425, and/or the third support member 405 each have a frame structure capable of withstanding a load and may contribute to durability or rigidity of the electronic device 200. The first support member 485, the second support member 425, and/or the third support member 405 may each include a nonmetallic material (e.g., polymer) or a metallic material. The housing (e.g., the housing 210 in FIG. 2) including the back cover (not illustrated), the first side cover 213, or the second side cover 214, the sliding plate 220, the flexible display 230, the printed circuit board 430, and the multi-bar structure 490 may be disposed on or coupled to the first support member 485, the second support member 425, and/or the third support member 405.

In the embodiment, the second support member 425 may be provided in the form of a plate. For example, the second support member 425 may be provided in the form of a plate that overlaps at least a part of the first support member 485 when viewed in a −z-axis direction. Alternatively, the second support member 425 may be coupled to the first support member 485 and/or the third support member 405. The second support member 425 may be positioned between the first support member 485 and the third support member 405. The third support member 405 may be coupled to the first support member 485 and/or the second support member 425 with the second support member 425 interposed therebetween. The printed circuit board 430 may be provided between the first support member 485 and the second support member 425 and disposed on the second support member 425. At least a part of each of the first support member 485, the second support member 425, and/or the third support member 405 may include a metallic material and/or a nonmetallic material (e.g., polymer).

In the embodiment, the sliding plate 220 may be slidably disposed on the first support member 485. For example, a sliding structure may be provided between the first support member 485 and the sliding plate 220. The sliding structure may couple the first support member 485 and the sliding plate 220 and support and guide the movement of the sliding plate 220. In the embodiment, the sliding structure may include at least one elastic structure (not illustrated). When the sliding plate 220 is moved by a predetermined distance by an external force, the at least one elastic structure (not illustrated) may change the state from the closed state in FIG. 2 to the open state in FIG. 3 or from the open state to the closed state without an additional external force. For example, at least one elastic structure (not illustrated) may include various elastic members such as a torsion spring. For example, the torsion spring, which is the elastic structure (not illustrated), may include one end connected to the sliding plate 220, the other end connected to the first support member 485, and a spring portion between one end and the other end. When the sliding plate 220 is moved by a predetermined distance in the first direction (e.g., the −x-axis direction) of the slide-out by an external force, a position of one end is changed relative to the other end, such that the sliding plate 220 may be moved in the first direction by elasticity of the spring portion without an additional external force. Therefore, the state may be changed from the closed state in FIG. 2 to the open state in FIG. 3. If the sliding plate 220 is moved by an external force by a predetermined distance in the second direction (e.g., the x-axis direction) opposite to the first direction, a position of one end is changed relative to the other end, such that the sliding plate 220 may be moved in the second direction by elasticity of the spring portion without an additional external force. Therefore, the state may be changed from the open state in FIG. 3 to the closed state in FIG. 2.

In the embodiment, the flexible display 230 may include a first section ① extending from the bendable section ②. The first section ① may be disposed on the sliding plate 220. When the state is changed from the closed state in FIG. 2 to the open state in FIG. 3, the bendable section ② connected to the first section ① may be extended while being slid by the movement of the sliding plate 220, such that the screen (see the screen 2301 in FIG. 3) may be expanded. When the state is changed from the open state in FIG. 2 to the closed state in FIG. 3, the bendable section ② is at least partially retracted into the electronic device 200 by the movement of the sliding plate 220, such that the screen (see the screen 2301 in FIG. 2) may be contracted. In the embodiment, the pulley (not illustrated) may be positioned to correspond to the bendable section ②. When the state changes between the closed state in FIG. 2 and the open state in FIG. 3, the pulley (not illustrated) may be rotated by the movement of the bendable section ②.

In the embodiment, in the closed state in FIG. 2 or the open state in FIG. 3, at least a part of the multi-bar structure 490 is positioned to overlap the screen 2301 (see FIG. 2 or 3) and support the bendable section ② so that the bendable section ② of the flexible display 230 is kept smoothly connected to the first section ① of the flexible display 230. The multi-bar structure 490 may contribute to the configuration in which the bendable section ② is movable while being kept smoothly connected to the first section ① when the state changes between the closed state in FIG. 2 and the open state in FIG. 3.

In the embodiment, a camera module 435 (e.g., the camera module 180 in FIG. 1), a charging circuit 440 (e.g., the power management module 188 in FIG. 1), an application processor (AP) 450 (e.g., the processor 120 in FIG. 1), a wireless communication circuit 465, a sliding sensor 470, an interface (e.g., the interface 177 in FIG. 1), and/or a memory (e.g., the memory 130 in FIG. 1) may be mounted on the printed circuit board 430.

In the embodiment, the camera module 435 (e.g., a rear camera) is arranged to be directed toward the rear surface of the electronic device 200 in the −z-axis direction, a part (e.g., a lens) of the camera module 435 may be exposed through a camera hole formed in the second support member 425. The camera module 435 may include one lens or a plurality of lenses, an image sensor, and/or an image signal processor. The camera module 435 may include a plurality of camera modules. The electronic device 200 may include a plurality of camera modules (e.g., a dual camera or a triple camera) having different attributes (e.g., angles of view) or different functions. For example, the camera module 435 including lenses having different angles of view may be provided as a plurality of camera modules. The electronic device 200 may perform control to change, on the basis of the user's selection, the angles of view of the camera module 435 that operates in the electronic device 200. In addition, the plurality of camera modules may include at least one of a wide-angle camera, a telephoto camera, a color camera, a monochrome camera, and an infrared (IR) camera (e.g., a TOF (time of flight) camera or a structured light camera). In the embodiment, the IR camera may operate as at least a part of the sensor module (not illustrated).

In the embodiment, the charging circuit 440 may be electrically connected to a wireless power receiving circuit 415 and/or the interface (e.g., the USB connector (not illustrated)). The charging circuit 440 may receive electric power, which is transmitted from a charging device (not illustrated), through the wireless power receiving circuit 415 or the USB connector and supply the electric power to a battery 480. In the embodiment, the charging circuit 440 may be electrically connected to the other constituent elements of the electronic device 200 and supply electric power to the other constituent elements of the electronic device 200. In the embodiment, the charging circuit 440 may be called a PMIC or a charger.

In the embodiment, the printed circuit board 430 may include at least one temperature sensor. For example, the at least one temperature sensor may be disposed in an area adjacent to the charging circuit 440, the AP 450, the wireless communication circuit 465, and the interface. In the embodiment, the at least one temperature sensor may be disposed on the third support member 405.

The at least one temperature sensor according to various embodiments may include first to fifth temperature sensors. However, the disclosure is not limited thereto.

For example, a first temperature sensor 413 may be disposed in an area adjacent to the wireless power receiving circuit 415. The first temperature sensor 413 may detect a change in temperature of the wireless power receiving circuit 415. As another example, a second temperature sensor 445 may be disposed in an area adjacent to the charging circuit 440. The second temperature sensor 445 may detect a change in temperature of the charging circuit 440. In still another example, a third temperature sensor 455 may be disposed in an area adjacent to the AP 450 and detect a change in temperature of the AP 450. In yet another example, a fourth temperature sensor 460 may be disposed in an area adjacent to the wireless communication circuit 465 and detect a change in temperature of the wireless communication circuit 465. In still yet another example, a fifth temperature sensor 475 may be disposed in an area adjacent to the interface (e.g., the USB connector) and detect a change in temperature of the interface.

In the embodiment, the sliding sensor 470 may include a sensor configured to detect a degree of the slide-out of the flexible display 230 from the housing 210 (e.g., detect the first state, the second state, and the third state). For example, the sliding sensor 470 may include a magnetic force sensor configured to detect a magnetic force that varies depending on a spacing distance from a magnetic element (e.g., a magnetic) disposed on the printed circuit board 430.

In the embodiment, the interface may include a high-definition multimedia interface (HDMI), a universal serial bus (USB) interface, an SD card interface, and/or an audio interface. The interface may electrically or physically connect the electronic device 200 to an external electronic device and include a USB connector, an SD card/MMC connector, or an audio connector.

In the embodiment, the memory may include a volatile memory or a non-volatile memory.

In the embodiment, the electronic device 200 may be disposed on the printed circuit board 430 or include various other constituent elements electrically connected to the printed circuit board 430. For example, the electronic device 200 may include the battery 480 positioned between the first support member 485 and the second support member 425 or between the second support member 425 and the third support member 405. The battery 480 refers to a device for supplying power to at least one constituent element of the electronic device 200. Examples of the battery 480 may include a primary battery, which cannot be recharged, a secondary battery, which can be recharged, or a fuel cell. The battery 480 may be integrally disposed in the electronic device 200 or disposed to be detachable from the electronic device 200.

In the embodiment, the electronic device 200 may include an antenna positioned between the first support member 485 and the second support member 425 or between the second support member 425 and the third support member 405. For example, the antenna may include a near-field communication (NFC) antenna, a wireless charging antenna, and/or a magnetic secure transmission (MST) antenna. For example, the antenna may perform near-field communication with an external device or transmit or receive electric power required for charging in a wireless manner. In the embodiment, the antenna 410 may be defined by a part of the first side cover 213 and/or a part of the second side cover 214 or a combination thereof.

Figure 5:
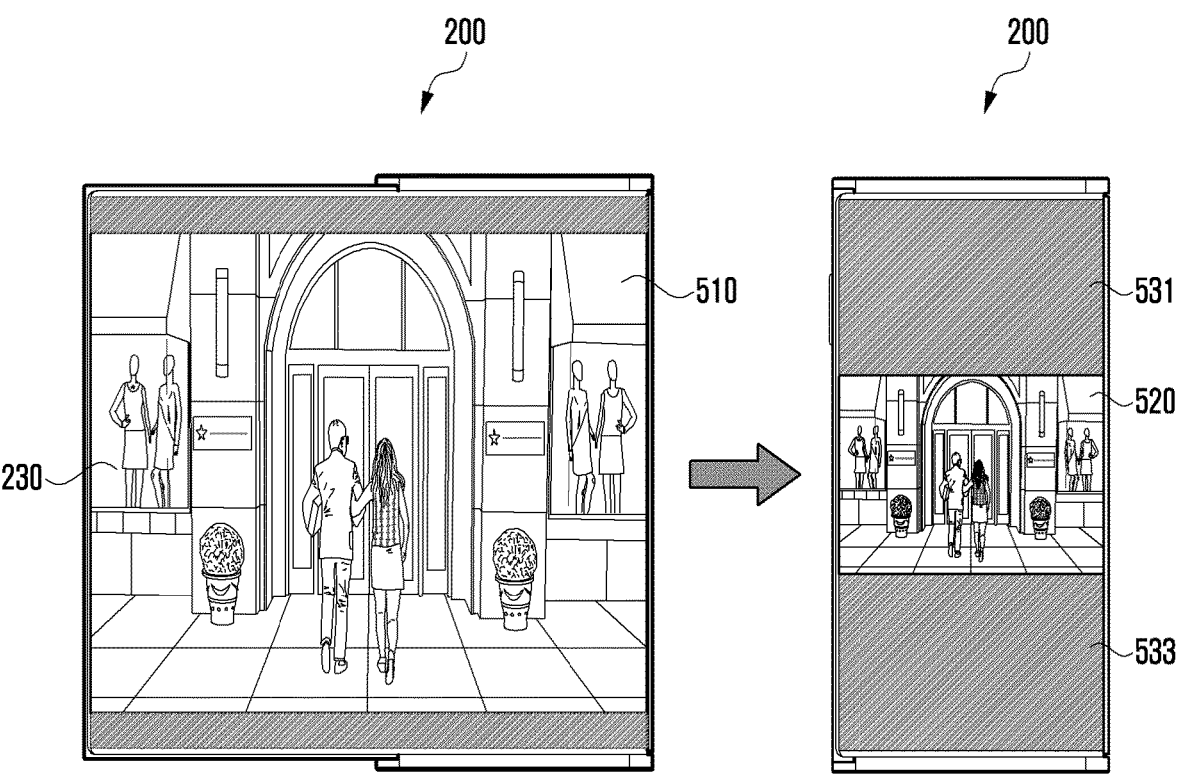
FIG. 5 is a view illustrating an output of content when the electronic device switches from a second state to a first state according to an embodiment of the disclosure.

FIG. 5 is a view illustrating an output of content when the electronic device switches from a second state to a first state according to an embodiment of the disclosure.

Referring to FIG. 5, the electronic device (e.g., the electronic device 200 in FIG. 2) according to various embodiments may output content on the flexible display (e.g., the flexible display 230 in FIG. 2) in the second state (or the open state) (e.g., the second state in FIG. 3).

According to various embodiments, in the second state, the electronic device 200 may be configured so that a size of a display area 510 of the content is substantially equal to a size of the flexible display 230. In the second state, a size or aspect ratio of an area 510 in which the content is displayed may be substantially equal to the size or aspect ratio of the flexible display 230.

According to various embodiments, the electronic device 200 may detect the change from the second state to the first state (or the closed state) (e.g., the first state in FIG. 2) and adjust the size of the area 520 of the content displayed in the first state. The electronic device 200 may adjust the size of the area 520 of the displayed content so that an aspect ratio of the area 520 of the content displayed in the first state is substantially equal to an aspect ratio of the area 510 of the content displayed in the second state.

With reference to FIG. 5, partial marginal areas 531 and 533 may be produced as the electronic device 200 adjusts the size of the area 520 of the displayed content so that the aspect ratio of the area 520 of the content displayed in the first state is substantially equal to the aspect ratio of the area 510 of the content displayed in the second state. The marginal areas 531 and 533 may each mean an area (e.g., a pillar box or a letter box) made by excluding the area 520 of the displayed content from the area in which the flexible display 230 may display the content. The presence of the marginal areas 531 and 533 may decrease a degree of immersion into the content when the user watches the content.

Hereinafter, there will be described a specific embodiment in which the marginal areas 531 and 533 are minimized as the state is changed from the second state to the first state (or from the first state to the second state) while the electronic device 200 displays the content.

Figure 6:
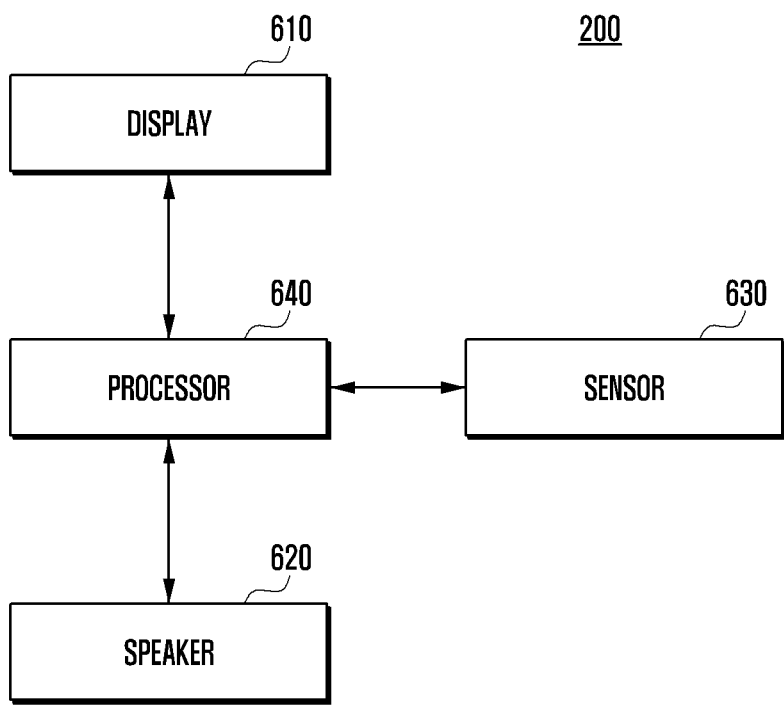
FIG. 6 is a block diagram of the electronic device according to an embodiment of the disclosure.

FIG. 6 is a block diagram of the electronic device according to an embodiment of the disclosure.

Referring to FIG. 6, the electronic device (e.g., the electronic device 200 in FIG. 2) according to various embodiments may include a display 610, a speaker 620, a sensor 630, and/or a processor 640.

According to various embodiments, the display 610 may display at least a part of the content temporarily or non-temporarily stored in the memory (e.g., the memory 130 in FIG. 1) under the control of the processor 640. In case that the content includes a plurality of images (or videos) and audio data, the display 610 may sequentially display the plurality of images under the control of the processor 640.

According to various embodiments, the display 610 may include the sliding plate (e.g., the sliding plate 220 in FIG. 2) capable of being slid out of or slid into the housing (e.g., the housing 210 in FIG. 2), and/or the bendable section (e.g., the bendable section in FIG. 3) capable of being extended from or retracted into the internal space (e.g., the internal space in FIG. 2) of the housing coupled to the sliding plate 220 while overlapping the sliding plate 220.

According to various embodiments, the speaker 620 may output at least a part of the content temporary or non-temporarily stored in the memory 130 under the control of the processor 640. In case that the content includes the plurality of images (or videos) and the audio data, the speaker 620 may output the audio data under the control of the processor 640.

According to various embodiments, the sensor 630 (e.g., the sliding sensor 470 in FIG. 4) may detect a degree of the slide-out (or slide-in) of the flexible display 230 from the housing 210 and transfer the detection information to the processor 640. The sensor 470 may detect the first state in which at least a part of the bendable section is retracted into the internal space of the housing 210 by the slide-in of the sliding plate 220, and/or the second state in which at least a part of the bendable section is extended out of the housing 210 by the slide-out of the sliding plate 220. According to the embodiment, the sensor 630 may include a magnetic force sensor configured to detect a magnetic force that varies depending on a spacing distance from a magnetic element (e.g., a magnetic) disposed on the printed circuit board (e.g., the printed circuit board 430 in FIG. 4). The sensor 630 may detect a degree of the slide-out (or slide-in) of the flexible display 230 on the basis of a magnitude of the magnetic force. For example, the magnetic force sensor and/or a Hall sensor of the electronic device 200 may each include a transmitter configured to generate a magnetic field at a particular frequency, and a receiver configured to receive the magnetic field generated by the transmitter. The magnetic force sensor and/or the Hall sensor of the electronic device 200 may acquire a movement direction and/or a movement distance of the sliding plate 220 in the housing 210 in accordance with the information on the states (e.g., the first state and the second state) of the electronic device 200.

According to the embodiment, the sensor 630 may be operatively or electrically connected to the processor 640 and provide the processor 640 with data collected under the control of the processor 640. In addition, the processor 640 may make new information by combining pieces of information, which are acquired by the plurality of sensors (not illustrated) included in the sensor 630, into single information. For example, the plurality of sensors may include an acceleration sensor, a gyro sensor, a magnetic sensor, a Hall sensor, an angle encoder, a stretching sensor, a proximity sensor, a rotary sensor, a piezoelectric sensor, or a touch panel sensor. According to various embodiments, the plurality of sensors is provided for illustrative purposes only. The sensor 630 may further include one or more different types of sensors.

According to various embodiments, the processor 640 may be operatively connected to the display 610, the speaker 620, and/or the sensor 630 and control the output of the content on the basis of a degree to which at least a part of the bendable section is extended from (retracted into) the internal space of the housing 210.

According to various embodiments, the processor 640 may control the display 610 and/or the speaker 620 to output the content including images including one or more objects and audio data.

According to the embodiment, the processor 640 may detect, through the sensor 630, a state in which the display 610 is maximally expanded by the slide-out of the sliding plate 220 of the electronic device 200 (or a state in which the display 610 cannot be expanded any further). The processor 640 may control the display 610 to display the content with an original aspect ratio (or an aspect ratio corresponding to the state in which the display 610 is maximally expanded) and control the speaker 620 to output the audio data.

According to various embodiments, in case that the content is implemented as videos, the content may include a plurality of images and audio data. One or more images of the plurality of images may include objects. The audio data may be defined as an assembly of a plurality of sounds. The plurality of sounds may include sounds respectively corresponding to one or more objects, and/or sounds corresponding to the background.

According to various embodiments, the processor 640 may detect, through the sensor 630, the state in which the display 610 is maximally expanded by the slide-out of the sliding plate 220 of the electronic device 200 (or the state in which the display 610 cannot be expanded any further). The processor 640 may control the speaker 620 to output the audio data including the plurality of sounds.

According to various embodiments, the processor 640 may detect the slide-in of the sliding plate 220 (or the change from the second state to the first state) through the sensor 630. The processor 640 may control the display 610 to display some of the images including the objects among the images in response to the detection of the slide-in of the sliding plate 220. A partial area of the image may include an area in which the object accounts for a predetermined ratio or more. For example, a partial area of the image may mean an area including the object. The processor 640 may identify, through the sensor 630, a degree to which at least a part of the bendable section is retracted into the internal space of the housing 210. The processor 640 may determine a size (or an aspect ratio) of a partial area of the image on the basis of the degree to which at least a part of the bendable section is retracted into the internal space of the housing 210.

According to the embodiment, the memory (e.g., the memory 130 in FIG. 1) may store mapping data made by mapping the degree to which at least a part of the bendable section is retracted into the internal space of the housing 210 and the size of the screen displayed on the display 610. Referring to the mapping data, the processor 640 may identify the size (or the aspect ratio) of the partial area of the image corresponding to the degree to which at least a part of the bendable section is retracted into the internal space of the housing 210.

According to the embodiment, the size of the screen displayed on the display 610 may vary depending on the degree to which at least a part of the bendable section is retracted into the internal space of the housing 210. The size of the screen displayed on the display 610 may decrease as the degree to which at least a part of the bendable section is retracted into the internal space of the housing 210 increases. For example, a horizontal length of the screen displayed on the display 610 may decrease as the degree to which at least a part of the bendable section is retracted into the internal space of the housing 210 increases. On the contrary, the size of the screen displayed on the display 610 may increase as the degree to which at least a part of the bendable section is retracted into the internal space of the housing 210 decreases. For example, the horizontal length of the screen displayed on the display 610 may increase as the degree to which at least a part of the bendable section is retracted into the internal space of the housing 210 decreases.

According to various embodiments, the processor 640 may determine a size of a partial area of an image so that the size of the partial area of the image is substantially equal to the size of the screen that varies depending on the degree to which at least a part of the bendable section is retracted into the internal space of the housing 210. The processor 640 may crop the partial area of the image on the basis of the determined size and control the display 610 to display the cropped image. The cropped image may be a partial area of an image including an object.

With the above-mentioned method, the electronic device 200 may display the content so that the marginal areas 531 and 533 do not exist. Because the object is included in the displayed image, the electronic device 200 may allow the user, who watches the content, to concentrate on the object. A specific embodiment in which a partial area is selected from the image will be described with reference to FIGS. 9A to 9E.

According to various embodiments, the audio data may include the plurality of sounds, and the plurality of sounds may include sounds corresponding to the objects, and sounds corresponding to the background. The processor 640 may control the speaker 620 to output the sound corresponding to the object included in the partial area of the image.

According to various embodiments, the processor 640 may divide the audio data into the plurality of sounds in various ways. According to the embodiment, the processor 640 may analyze the image included in the content and identify the objects (e.g., persons, nature, or items) that output the sounds. The processor 640 may divide the audio data included in the content into the sounds outputted by the objects (e.g., the sound corresponding to the conversation outputted by the person, the sound outputted by the nature, or the sound outputted by the item). With the above-mentioned method, the processor 640 may divide the audio data into the plurality of sounds. The processor 640 may distinguish the plurality of sounds included in the audio data in accordance with a process before playing the content, storage of the content, and/or production of the content. The processor 640 may distinguish the plurality of sounds included in the audio data in response to the user's input that request the playback of the content.

According to various embodiments, the processor 640 may store the mapping data, which are made by mapping information on the plurality of sounds, the object in the image, or the background, in the memory 130. The information on the object in the image or the background may include a position or size of the object or background. The processor 640 may extract the sound corresponding to the object included in the partial area while producing the partial area of the image including the object and control the speaker 620 to output the extracted sound.

According to various embodiments, on the basis of the degree to which at least a part of the bendable section is retracted into the internal space of the housing 210, the electronic device 200 may display the partial area of the image including the object and output the sound corresponding to the object included in the partial area of the image. The other sounds excluding the sounds corresponding to the objects (e.g., the sounds corresponding to objects (or the background) that are not included in the partial area of the image) may not be outputted. According to another embodiment, the processor 640 may allow the other sounds excluding the sounds corresponding to the objects (e.g., the sounds corresponding to the objects (or the background) that are not included in the partial area of the image) to be outputted to be small in magnitude than the sounds corresponding to the objects.

According to various embodiments, the processor 640 may output at least some of the audio data on the basis of the degree to which at least a part of the bendable section is retracted into the internal space of the housing 210.

According to various embodiments, the processor 640 may detect a change in degree to which at least a part of the bendable section is retracted into the internal space of the housing 210, adjust the size of the partial area of the image, and adjust the audio data to be outputted. According to the embodiment, the processor 640 may identify whether the object is changed (e.g., the object is added or eliminated) in the partial area of the image that varies depending on a change in degree to which the bendable section is retracted into the internal space of the housing 210. The processor 640 may detect a change in object, select the sound corresponding to the changed object, and output the selected sound.

According to various embodiments, on the basis of the degree to which at least a part of the bendable section is retracted into the internal space of the housing 210, the processor 640 may adjust magnitudes of at least some of the audio data to be outputted (e.g., the other sounds excluding the sounds corresponding to the objects among the audio data). According to the embodiment, the processor 640 may allow the other sounds excluding the sounds corresponding to the objects among the audio data to be outputted to be small in magnitude than the sounds corresponding to the objects in response to the detection, by the sensor 630, of the change from the second state to the first state. On the basis of the degree to which at least a part of the bendable section is retracted into the internal space of the housing 210, the processor 640 may determine the magnitudes of the other sounds excluding the sounds corresponding to the objects among the audio data. For example, the processor 640 may further decrease the magnitudes of the other sounds excluding the sounds corresponding to the objects among the audio data as the degree to which at least a part of the bendable section is retracted into the internal space of the housing 210 increases. The processor 640 may maintain the magnitude of the sound corresponding to the object while muting the other sounds in response to the state in which the electronic device 200 completely switches to the first state (e.g., the state in which the display 610 cannot be contracted any further).

According to the embodiment, in the second state, the electronic device 200 may output all the plurality of sounds included in the audio data. The magnitudes of the other sounds, which exclude the sounds corresponding to the objects among the plurality of sounds included in the audio data, may decrease as the degree to which at least a part of the bendable section is retracted into the internal space of the housing 210 increases while the electronic device 200 switches from the second state to the first state. When the electronic device 200 completely switches to the first state, the electronic device 200 may output only the sound corresponding to the object but may not output the other sounds excluding the sounds corresponding to the objects among the plurality of sounds.

According to various embodiments, the processor 640 may extract (or crop) the partial area including the predesignated object from the image in response to the identification of the presence of the object predesignated in the image included in the content. The processor 640 may output the sound corresponding to the predesignated object among the plurality of sounds. For example, the processor 640 may extract (or crop) the partial area including the predesignated object from the image in response to the identification of the presence of the predesignated object in the image in which at least two or more objects are present. The designated object may be an object that satisfies a designated condition (e.g., a particular person, item, animal, or location included in video content). The designated condition may be configured by the user's input.

According to various embodiments, the processor 640 may detect the slide-out of the sliding plate 220 (or the change from the first state to the second state) through the sensor 630. The processor 640 may control the display 610 to display some of the images including the partial area among the images in response to the detection of the slide-out of the sliding plate 220. A partial area of the image may include an area in which the object accounts for a predetermined ratio or more. For example, a partial area of the image may mean an area including the object. The processor 640 may identify, through the sensor 630, a degree to which at least a part of the bendable section is extended to an external space of the housing 210. The processor 640 may determine a size (or an aspect ratio) of a partial area of the image on the basis of the degree to which at least a part of the bendable section is extended to the external space of the housing 210. Referring to the mapping data stored in the memory 130, the processor 640 may identify the size (or the aspect ratio) of the partial area of the image corresponding to the degree to which at least a part of the bendable section is extended to the external space of the housing 210. For example, the processor 640 may increase the size of the partial area as the degree to which at least a part of the bendable section is extended to the external space of the housing 210 increases.

According to various embodiments, the processor 640 may output at least some of the audio data on the basis of the degree to which at least a part of the bendable section is extended to the external space of the housing 210. The processor 640 may control the speaker 620 to output the other sounds excluding the sounds corresponding to the objects included in the image as the degree to which at least a part of the bendable section is extended to the external space of the housing 210 increases.

According to various embodiments, on the basis of the degree to which at least a part of the bendable section is extended to the external space of the housing 210, the processor 640 may determine the magnitudes of the other sounds excluding the sounds corresponding to the objects among the audio data. The processor 640 may increase the magnitudes of the other sounds excluding the sounds corresponding to the objects (e.g., the sounds corresponding to the objects (or background) that are not included in the partial area of the image) as the degree to which at least a part of the bendable section is extended to the external space of the housing 210 increases. The processor 640 may output all the plurality of sounds included in the audio data in response to the state in which the electronic device 200 completely switches to the second state (e.g., the state in which the display 610 cannot be expanded any further).

According to the embodiment, when the electronic device 200 is in the first state, the electronic device 200 may output only the sound corresponding to the object but may not output the other sounds excluding the sounds corresponding to the objects among the plurality of sounds. The magnitudes of the other sounds, which excludes the sounds corresponding to the objects among the plurality of sounds included in the audio data, may increase as the degree to which at least a part of the bendable section is extended to the external space of the housing 210 increases while the electronic device 200 switches from the first state to the second state. As the state is changed to the second state, the electronic device 200 may output all the plurality of sounds included in the audio data.

The above-mentioned embodiments have been described in which the size (or the aspect ratio) of the partial area of the image is determined, the partial area is cropped, and/or the output of the sound is controlled on the basis of a degree to which at least a part of the bendable section is retracted into the internal space (or extended to the external space) of the housing 210. However, the processor 620 may control the size (or the aspect ratio) of the partial area of the image and/or the output of the sound on the basis of a size of an area in which the content may be outputted (or an area of the display 610 exposed to the outside) among the areas of the display 610 made when the state is changed from the second state to the first state (or from the first state to the second state) instead of the degree to which at least a part of the bendable section is retracted into the internal space of the housing 210. When the degree to which at least a part of the bendable section is retracted into the internal space of the housing 210 is changed, the size of the area in which the content may be outputted may also be changed. On the basis of the size of the area in which the content may be outputted, the processor 640 may determine the size of the partial area of the image, select the sound to be outputted, or adjust the magnitude of the sound to be outputted.

According to various embodiments, the electronic device 200 may include the drive device such as a motor connected to the display 610. The electronic device 200 may switch from the closed state to the open state or from the open state to the closed state under the control of the drive device. The processor 640 in the second state may output the content on the display 610 may switch to the first state in response to the identification of the presence of the predesignated object in the image included in the content. The processor 640 may switch the state from the second state to the first state by controlling the drive device.

According to various embodiments, as the state is changed to the first state, the processor 640 may extract (or crop) the partial area including the predesignated object from the image. The processor 640 may control the display 610 to display the extracted image. The processor 640 may identify, through the sensor 630, the degree to which at least a part of the bendable section is retracted into the internal space of the housing 210. The processor 640 may determine the size (or the aspect ratio) of the partial area of the image on the basis of the degree to which at least a part of the bendable section is retracted into the internal space of the housing 210. The processor 640 may extract (or crop) the partial area including the predesignated object from the image on the basis of the determined size.

According to various embodiments, on the basis of the degree to which at least a part of the bendable section is retracted into the internal space of the housing 210, the processor 640 may display the partial area of the image including the object and output the sound corresponding to the object included in the partial area of the image. The other sounds excluding the sounds corresponding to the objects (e.g., the sounds corresponding to objects (or the background) that are not included in the partial area of the image) may not be outputted. According to another embodiment, the processor 640 may allow the other sounds excluding the sounds corresponding to the objects (e.g., the sounds corresponding to the objects (or the background) that are not included in the partial area of the image) to be outputted to be small in magnitude than the sounds corresponding to the objects.

According to various embodiments, in the state in which the state is changed to the first state, the processor 640 may switch the state to the second state again in response to the identification of the absence of the particular object in the displayed image. The processor 640 may switch the state from the first state to the second state by controlling the drive device.

FIGS. 7A, 7B, 7C, and 7D are views illustrating embodiments in which content is outputted when the electronic device switches from the second state to the first state according to various embodiments of the disclosure.

Figure 7A:
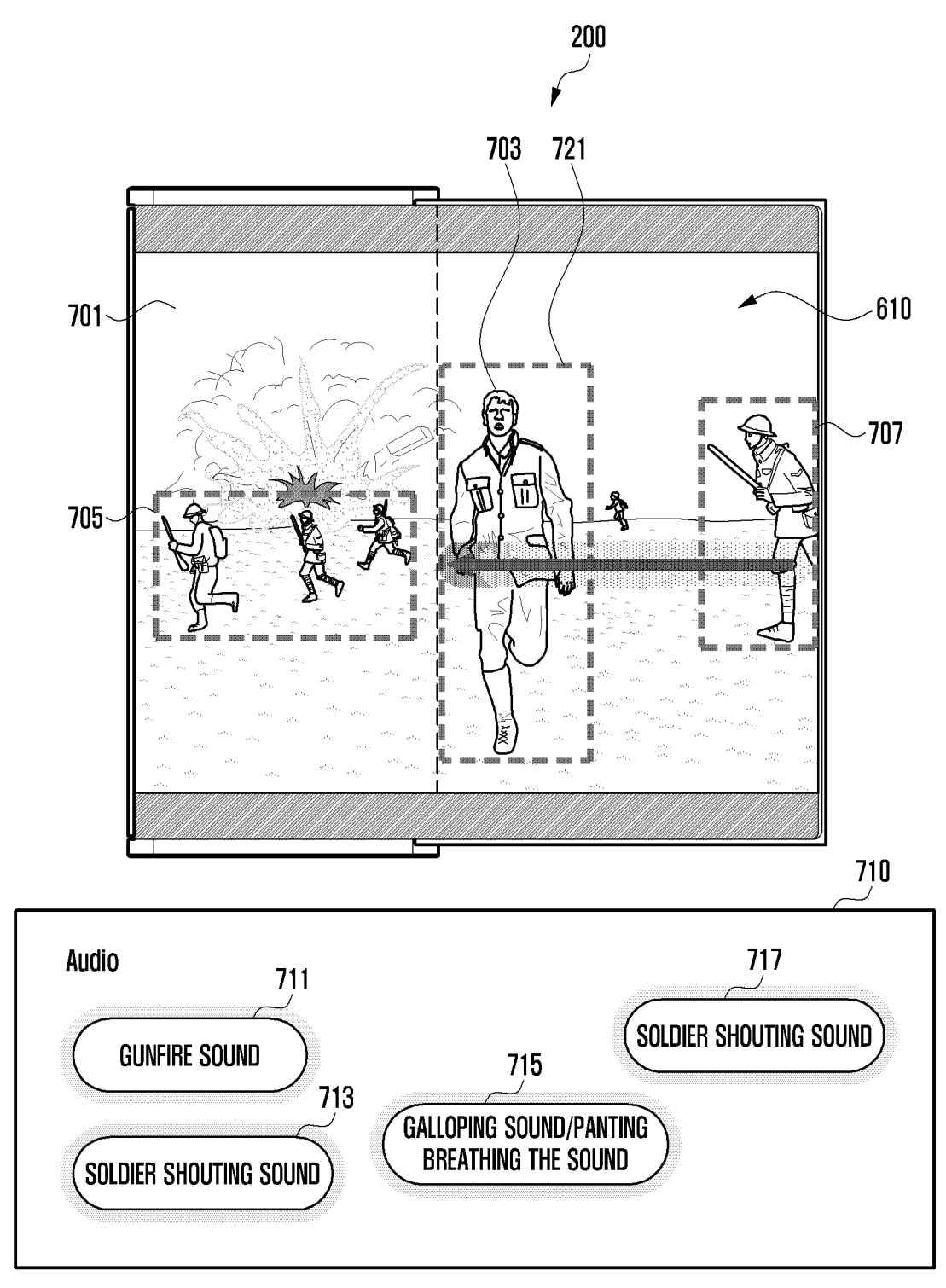
FIGS. 7A, 7B, 7C, and 7D are views illustrating embodiments in which content is outputted when the electronic device switches from the second state to the first state according to various embodiments of the disclosure.

Referring to FIG. 7A, the electronic device (e.g., the electronic device 200 in FIG. 6) in the second state may output the content through the display 610 and/or the speaker (e.g., the speaker 620 in FIG. 6).

According to various embodiments, the content may include one or more images 701 and audio data 710. The image 701 may include one or more objects 703, 705, and 707, and the audio data 710 may include one or more sounds 711, 713, 715, and 717.

According to various embodiments, in the second state, the electronic device 200 may output the content by displaying the entire image 701 on the display 610 and outputting all the audio data 710 through the speaker 620.

Referring to FIG. 7A, the electronic device 200 may output the audio data 710 including a gunfire sound 711, which is the background sound, a soldier shouting sound 713 corresponding to an object 705, a galloping sound/panting breathing sound 715 corresponding to an object 703, and/or a soldier shouting sound 717 corresponding to an object 707.

According to various embodiments, the electronic device 200 may detect the slide-in of the sliding plate 220 (or the change from the second state to the first state) through the sensor (e.g., the sensor 630 in FIG. 6). In response to the detection of the slide-in of the sliding plate 220, the electronic device 200 may identify, through the sensor 630, the degree to which at least a part of the bendable section is retracted into the internal space of the housing 210 and extract the partial area from the image 701. The electronic device 200 may determine a size of the extracted partial area on the basis of the degree to which at least a part of the bendable section is retracted into the internal space of the housing 210. The size of the extracted partial area may be substantially equal to the size of the area that may be displayed in the display 610.

Figure 7B:
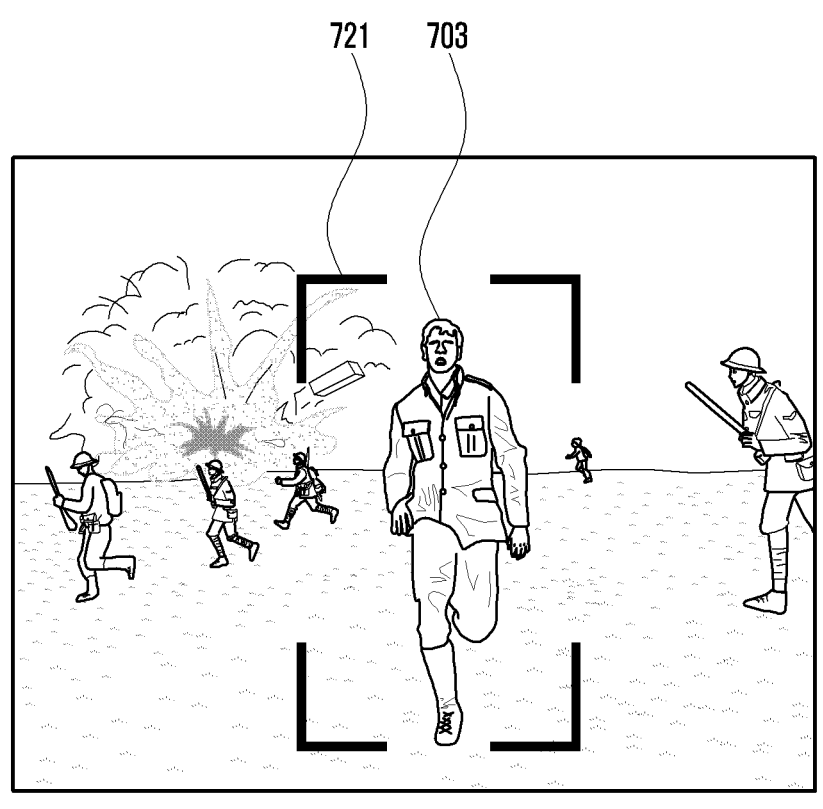

Referring to FIG. 7B, to extract the partial area, the electronic device 200 may select at least one object 703 from the objects 703, 705, and 707 in the image 701 and extract a partial area 721 so that the selected object 703 is included.

Figure 7C:
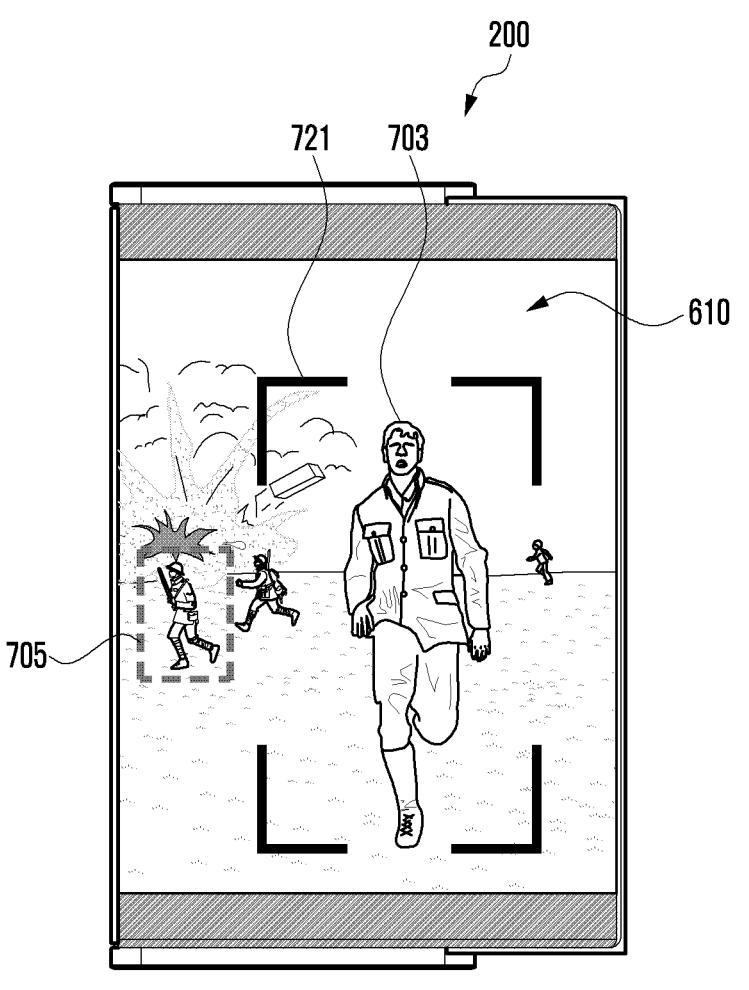
Figure 7C:
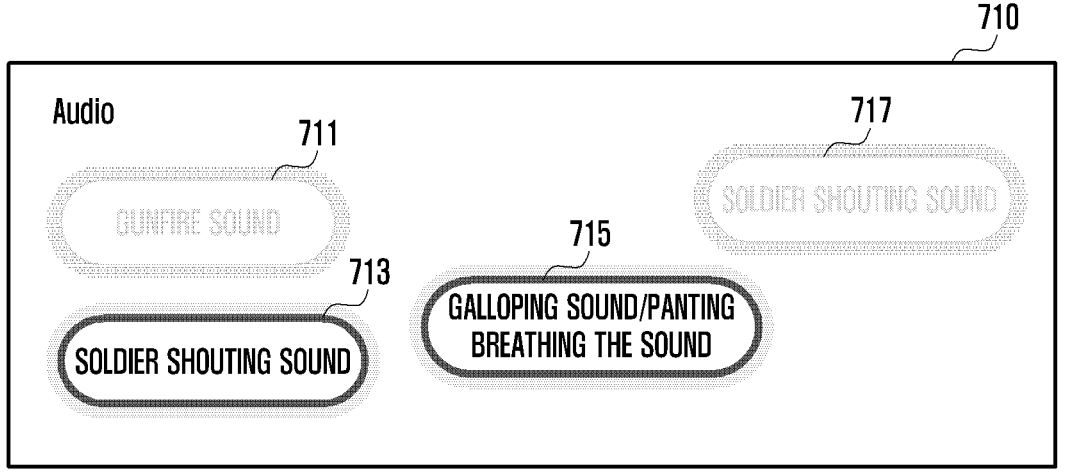

FIG. 7C illustrates the electronic device 200 in which a part of the bendable section is retracted into the internal space of the housing (e.g., the housing 210 in FIGS. 2 and 3) (e.g., the third state), such that the size of the displayed area is relatively small.

Referring to FIG. 7C, the electronic device 200 may display the extracted partial area 721 on the display 610.

According to various embodiments, the electronic device 200 may output at least some of the audio data 710 on the basis of the degree to which at least a part of the bendable section is retracted into the internal space of the housing 210.

According to various embodiments, on the basis of the degree to which at least a part of the bendable section is retracted into the internal space of the housing 210, the electronic device 200 may display the partial area 721 of the image 701 including the objects and output the sounds 713 and 715 corresponding to the objects 703 and 705 included in the partial area 721 of the image. The other sounds 711 and 717 excluding the sounds 713 and 715 corresponding to the objects may not be outputted.

According to another embodiment, the electronic device 200 may allow the other sounds 711 and 717 excluding the sounds 713 and 715 corresponding to the objects to be outputted to be small in magnitude than the sounds 713 and 715 corresponding to the objects 705 and 707. On the basis of the degree to which at least a part of the bendable section is retracted into the internal space of the housing 210, the electronic device 200 may adjust the magnitudes of the other sounds 711 and 717 excluding the sounds 713 and 715 corresponding to the objects. For example, the electronic device 200 may further decreases the magnitudes of the other sounds 711 and 717 excluding the sounds 713 and 715 corresponding to the objects as the degree to which at least a part of the bendable section is retracted into the internal space of the housing 210 increases.

Referring to FIG. 7C, the electronic device 200 may output the soldier shouting sound 713 corresponding to the object 705 and the galloping sound/panting breathing sound 715 corresponding to the object 703 without outputting the gunfire sound 711, which is the background sound, and/or the soldier shouting sound 717 corresponding to the object 707.

Figure 7D:
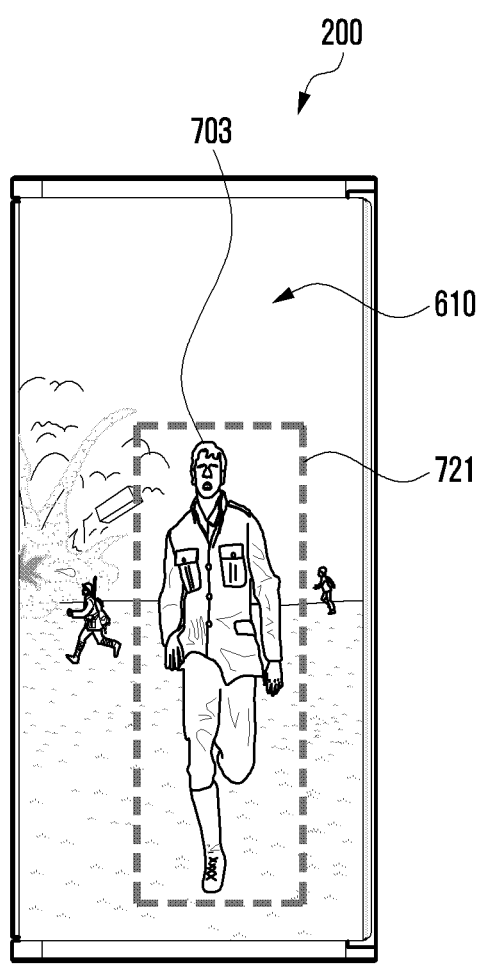
Figure 7D:
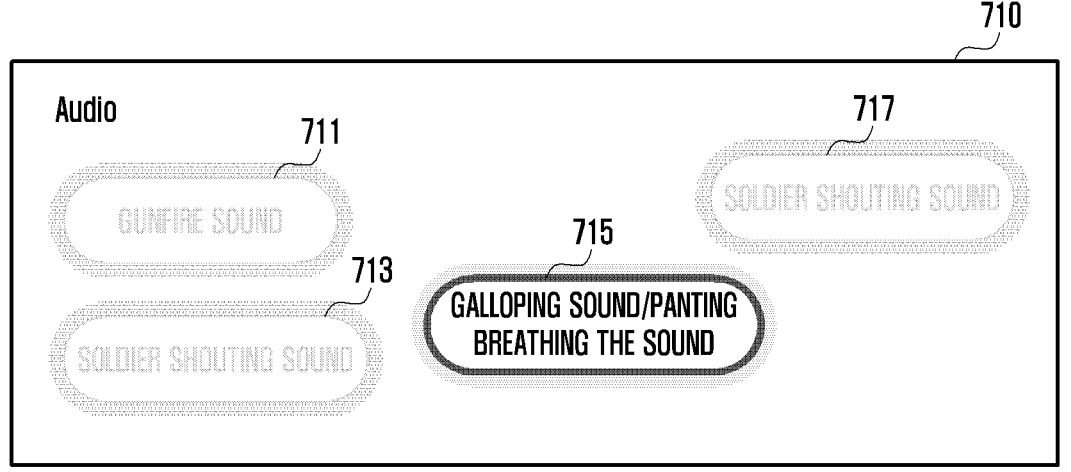

FIG. 7D illustrates the electronic device 200 in which the bendable section is maximally retracted into the internal space of the housing 210 (e.g., the second state), such that the size of the displayed area is minimized.

According to various embodiments, the electronic device 200 may detect a change in degree to which at least a part of the bendable section is retracted into the internal space of the housing 210, adjust the size of the partial area of the image, and adjust the audio data to be outputted. According to the embodiment, the electronic device 200 may identify whether the object is changed (e.g., the object is added or eliminated) in the partial area of the image that varies depending on a change in degree to which the bendable section is retracted into the internal space of the housing 210. The electronic device 200 may detect a change in object, select the sound corresponding to the changed object, and output the selected sound.

According to various embodiments, on the basis of the degree to which at least a part of the bendable section is retracted into the internal space of the housing 210, the electronic device 200 may display the partial area 721 of the image 701 including the objects and output the sound 715 corresponding to the object 703 included in the partial area 721 of the image. The other sounds 711, 713, and 717 excluding the sound 715 corresponding to the object may not be outputted.

Referring to FIG. 7D, the electronic device 200 may output the galloping sound/panting breathing sound 715 corresponding to the object 703 without outputting the gunfire sound 711, which is the background sound, and/or the soldier shouting sounds 713 and 717 corresponding to the object 705 and 707.

With the above-mentioned method, on the basis of the degree to which at least a part of the bendable section is retracted into the internal space of the housing 210, the electronic device 200 may extract and display the partial area of the image and adjust the magnitudes of at least some of the audio data to be outputted (e.g., the other sounds excluding the sounds corresponding to the objects among the audio data).

Figure 8:
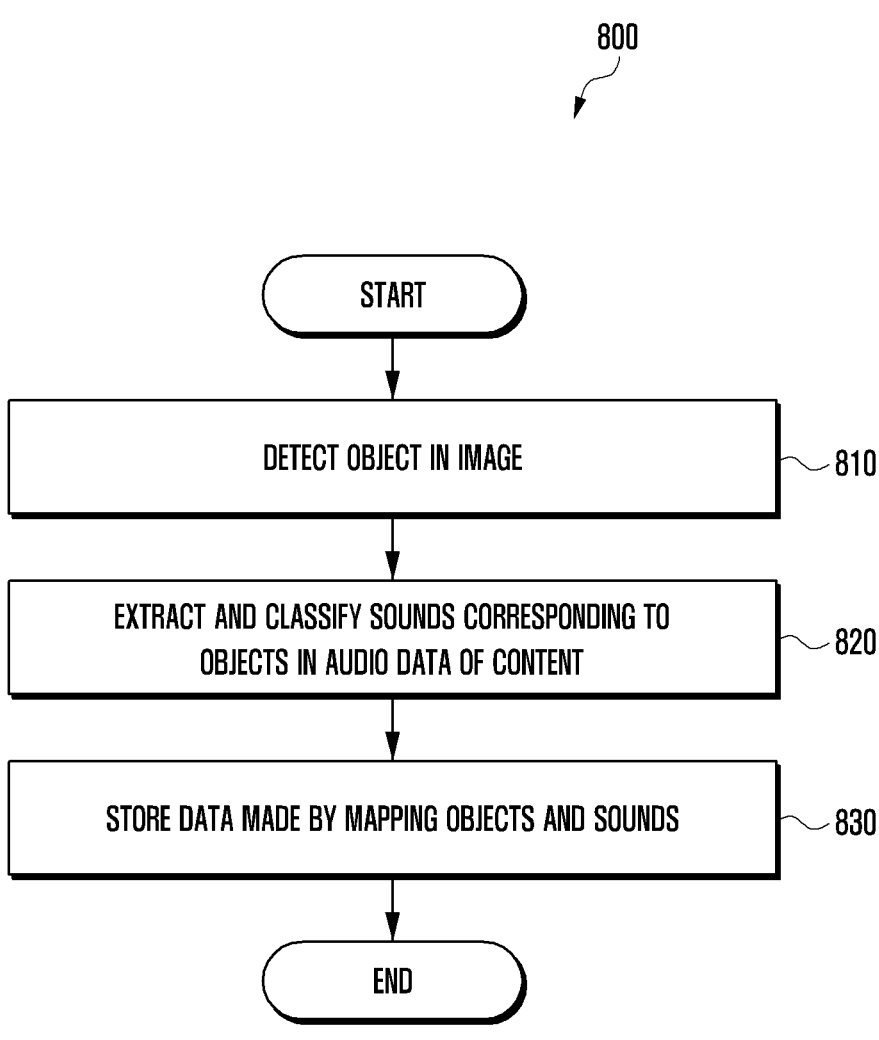
FIG. 8 is a view illustrating an embodiment in which objects and audio data included in content are classified in the electronic device according to an embodiment of the disclosure.

FIG. 8 is a view illustrating an operation 800 of classifying objects and audio data included in the content in the electronic device according to an embodiment of the disclosure.

Referring to FIG. 8, in operation 810, the electronic device (e.g., the electronic device 200 in FIG. 6) may detect the objects (e.g., the objects 703, 705, and 707 in FIG. 7A) included in the image (e.g., the image 701 in FIG. 7A) included in the content.

According to various embodiments, the electronic device 200 may analyze the image 701 and detect the objects 703, 705, and 707 included in the image 701 in various ways. The electronic device 200 may detect the objects 703, 705, and 707 and identify properties of the detected objects 703, 705, and 707. For example, the properties of the objects 703, 705, and 707 may include the types of the objects 703, 705, and 707 (e.g., persons or items), the sizes occupied by the objects 703, 705, and 707 in the image 701, and/or the positions of the objects 703, 705, and 707 on the image 701.

According to various embodiments, in operation 820, the electronic device 200 may extract and classify the sounds 713, 715, and 717 corresponding to the objects 703, 705, and 707 in the audio data (e.g., the audio data 710 in FIG. 7A) of the content.

According to various embodiments, the electronic device 200 may analyze the image included in the content and identify the objects (e.g., persons, nature, or items) that output the sounds. The electronic device 200 may divide the audio data included in the content into the sounds outputted by the objects (e.g., the sound corresponding to the conversation outputted by the person, the sound outputted by the nature, or the sound outputted by the item).

For example, in the embodiment illustrated in FIG. 7A, the electronic device 200 may divide the audio data 700 into the gunfire sound 711, which is the background sound, the soldier shouting sound 713 corresponding to the object 705, the galloping sound/panting breathing sound 715 corresponding to the object 703, and/or the soldier shouting sound 717 corresponding to the object 707.

According to various embodiments, in operation 830, the electronic device 200 may store data made by mapping the objects 703, 705, and 707 and/or the sounds 711, 713, 715, and 717.

According to various embodiments, the electronic device 200 may store the mapping data, which are made by mapping information on the plurality of sounds, the object in the image, and/or the background, in the memory 130. The information on the object in the image or the background may include a position and/or size of the object and/or background. The mapping data may be implemented in various ways or implemented as shown in Table 1 below.

TABLE 1

| Object identification information | Position of object | Size of object | Sound |
|---|---|---|---|
| Person 1 (703) | Position 1 | Size 1 | Sound 1 (715) |
| Person 2 (705) | Position 2 | Size 2 | Sound 2 (713) |
| Person 3 (707) | Position 3 | Size 3 | Sound 3 (717) |

According to various embodiments, the electronic device 200 may display the image, from which the partial area of the image 701 is cropped, on the display 610 on the basis of the degree to which at least a part of the bendable section is retracted into the internal space of the housing 210. The electronic device 200 may output the sound 715 corresponding to the object 703 included in the partial area but may not output the sound 713 and 717 corresponding to the object 705 and 707 that are not included in the partial area.

FIGS. 9A, 9B, 9C, 9D, and 9E are views illustrating embodiments in which at least a part of an image to be displayed is determined when the electronic device switches from the second state to the first state according to various embodiments of the disclosure.

According to various embodiments, the electronic device (e.g., the electronic device 200 in FIG. 6) may determine a size of a partial area of an image so that the size of the partial area of the image is substantially equal to the size of the screen that varies depending on the degree to which at least a part of the bendable section is retracted into the internal space of the housing (e.g., the housing 210 in FIG. 2).

According to various embodiments, to determine the position of the partial area to be extracted from the image, the electronic device 200 may analyze the image and/or the audio data included in the content and identify the objects (e.g., persons, nature, or items) that output the sounds. The electronic device 200 may divide the audio data included in the content into the sounds outputted by the objects (e.g., the sound corresponding to the conversation outputted by the person, the sound outputted by the nature, or the sound outputted by the item). The electronic device 200 may determine the position of the partial area to be extracted on the basis of the properties of the object.

Figure 9A:
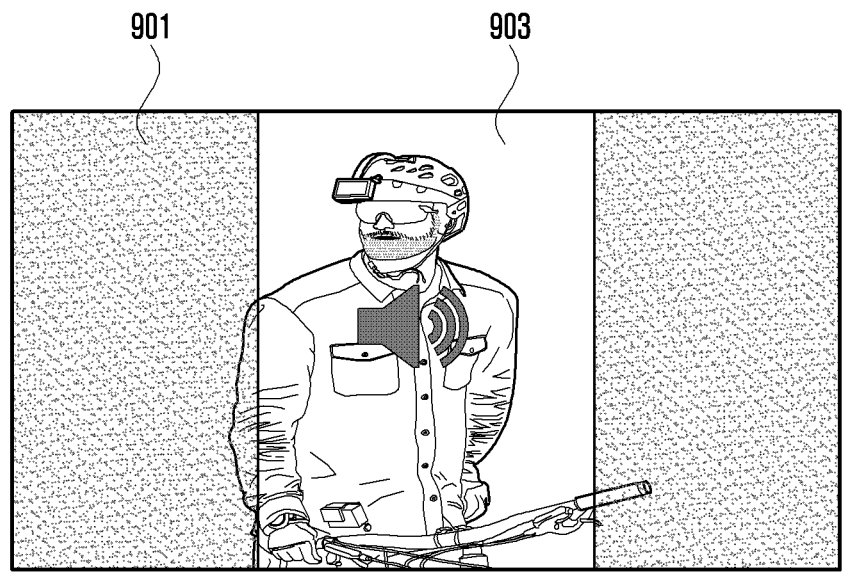
FIGS. 9A, 9B, 9C, 9D, and 9E are views illustrating embodiments in which at least a part of an image to be displayed is determined when the electronic device switches from the second state to the first state according to various embodiments of the disclosure.

Referring to FIG. 9A, the electronic device 200 may determine a position of a partial area 903 in an image 901 included in the content so as to include the object (a person or an object) that mainly outputs the sound, and the electronic device 200 may extract the partial area 903.

Figure 9B:
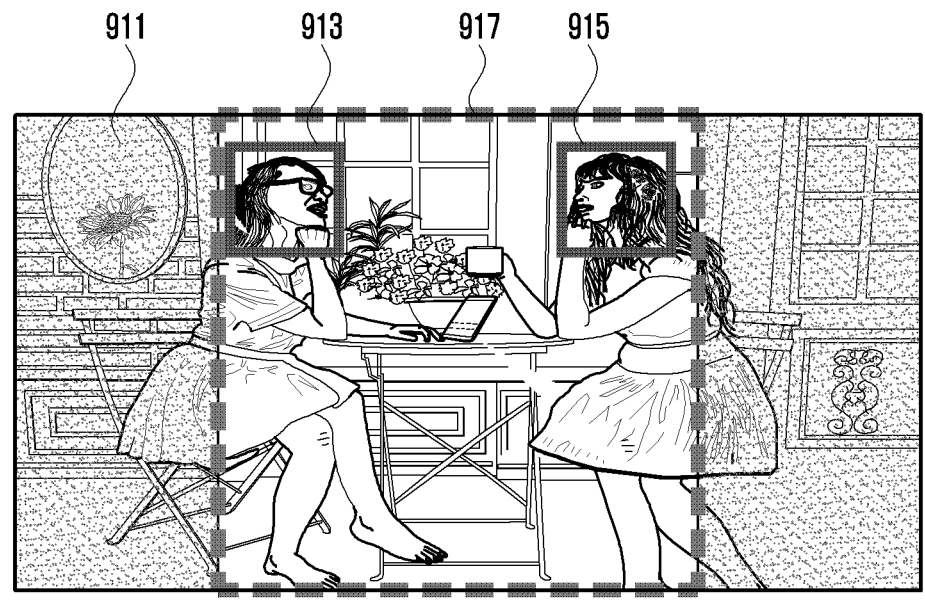

Referring to FIG. 9B, the electronic device 200 may determine a position of a partial area 917 and extract the partial area 917 so that a plurality of objects 913 and 915 is included in response to the identification of the state in which an image 911 included in the content includes the plurality of objects 913 and 915.

Figure 9C:
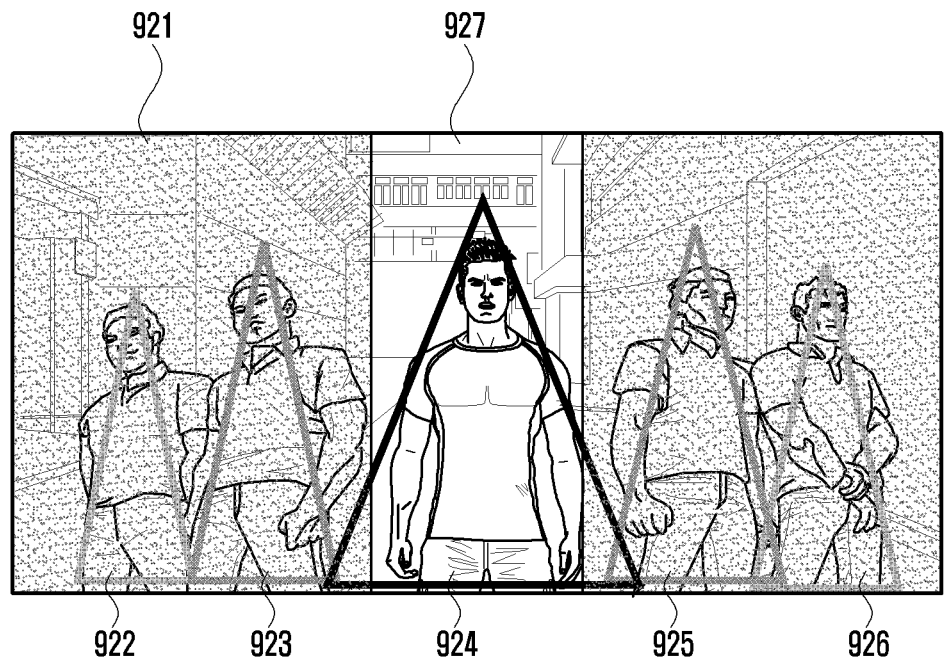

Referring to FIG. 9C, in case that an image 921 included in the content includes a plurality of objects 922, 923, 924, 925, and 926, the electronic device 200 may identify whether a size of an area including all the plurality of objects 922, 923, 924, 925, and 926 is equal to or larger than (or exceeds) a size determined on the basis of the degree to which at least a part of the bendable section is retracted into the internal space of the housing 210. In response to the identification of the state in which the size of the area including all the plurality of objects 922, 923, 924, 925, and 926 is equal to or larger than the determined size, the electronic device 200 may determine a position of a partial area 927 and extract the partial area 927 so that the object 924, which is largest among the plurality of objects 922, 923, 924, 925, and 926, is included.

Figure 9D:
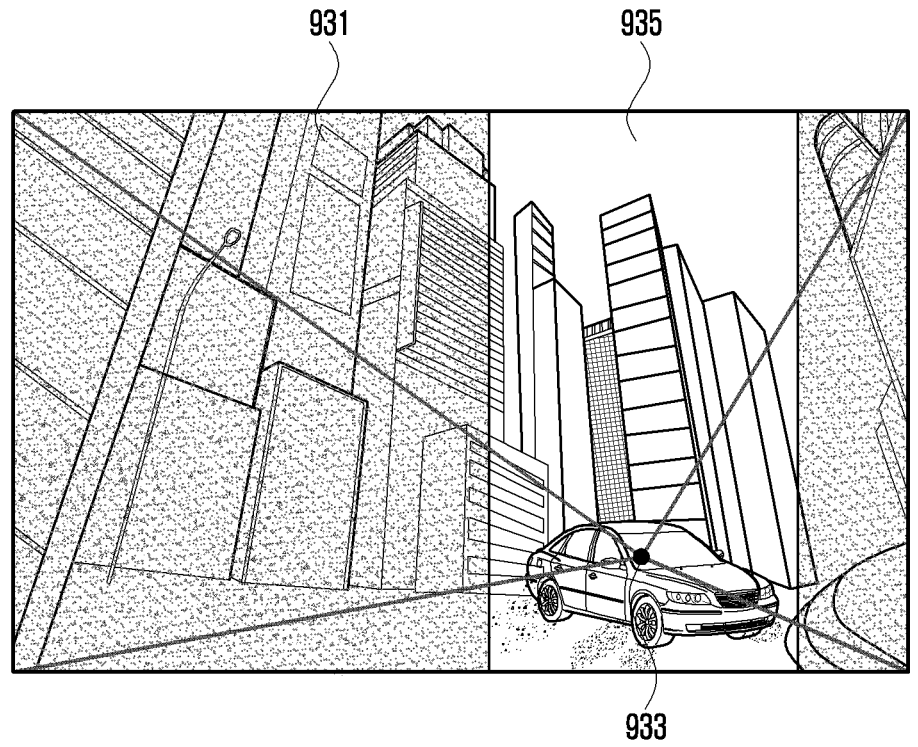

Referring to FIG. 9D, the electronic device 200 may identify whether a vanishing point 933 is present in an image 931 in response to the identification of the state in which the image 931 included in the content includes no object. The electronic device 200 may determine a position of a partial area 935 and extract the partial area 935 so that the vanishing point 933 is included in response to the identification of the state in which the vanishing point 933 is present in the image 931.

Figure 9E:
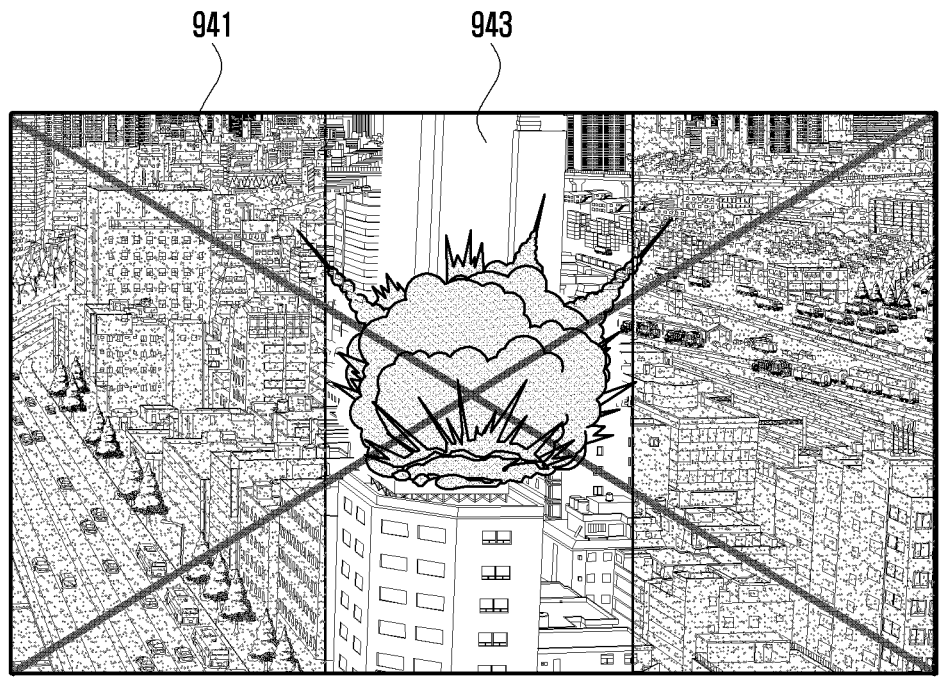

Referring to FIG. 9E, the electronic device 200 may identify whether a vanishing point is present in an image 941 in response to the identification of the state in which the image 941 included in the content includes no object. The electronic device 200 may determine a position of a partial area 943 and extract the partial area 943 so that a center of the image 941 is included in response to the identification of the state in which no vanishing point is present in the image 931.

Figure 10:
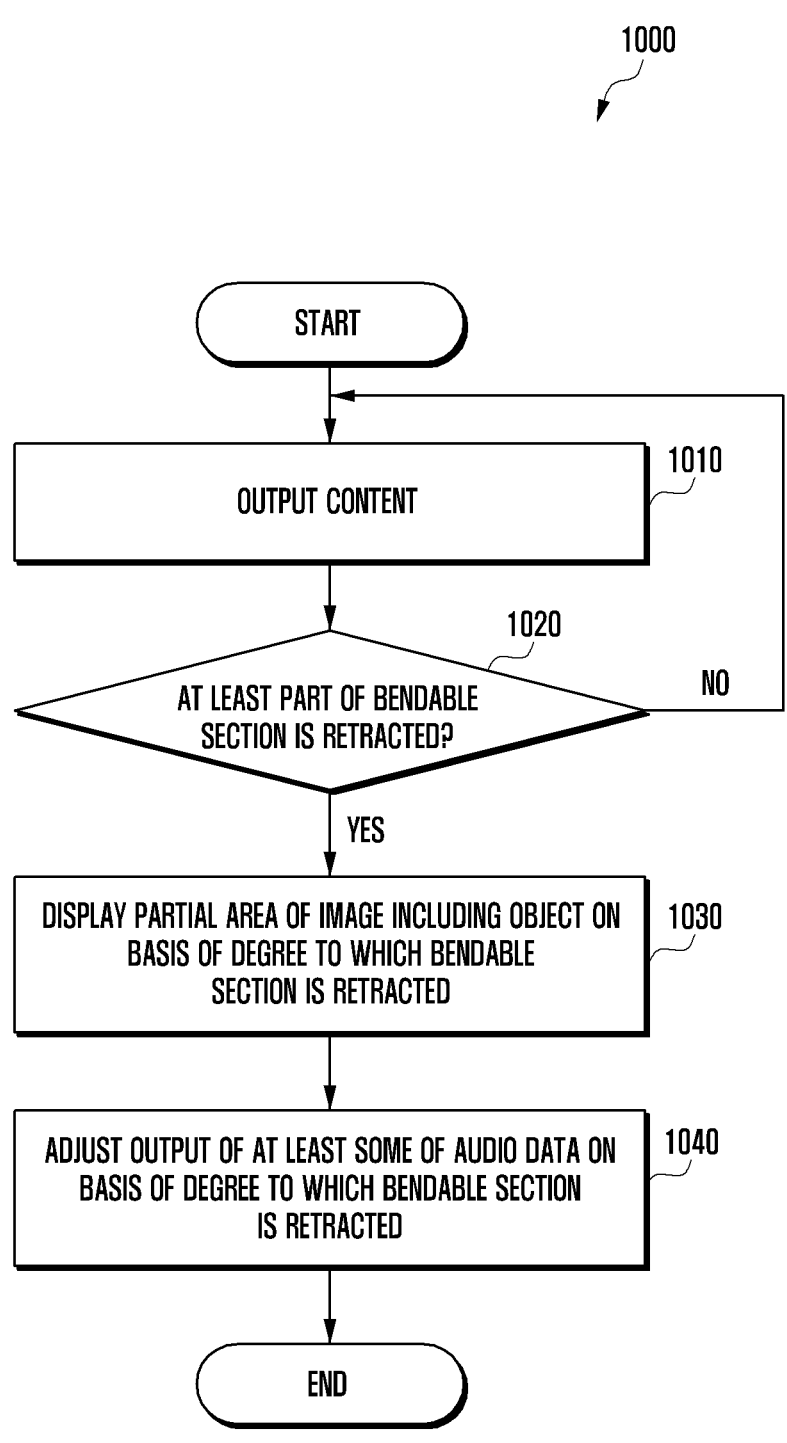
FIG. 10 is an operational flowchart illustrating a method of operating the electronic device according to an embodiment of the disclosure.

FIG. 10 is an operational flowchart illustrating a method 1000 of operating the electronic device according to an embodiment of the disclosure.

According to various embodiments, in operation 1010, the electronic device (e.g., the electronic device 200 in FIG. 6) may output the content.

According to various embodiments, in case that the content is implemented as videos, the content may include a plurality of images and audio data. One or more images of the plurality of images may include objects. The audio data may be defined as an assembly of a plurality of sounds. The plurality of sounds may include sounds respectively corresponding to one or more objects, and/or sounds corresponding to the background.

According to various embodiments, the electronic device 200 may control the display (e.g., the display 610 in FIG. 6) and/or the speaker (e.g., the speaker 620 in FIG. 6) to output the content including images including one or more objects and audio data.

According to the embodiment, in the state in which the display 610 is maximally expanded by the slide-out of the sliding plate 220 of the electronic device 200 (or the state in which the display 610 cannot be expanded any further), the electronic device 200 may control the display 610 to display the content with an original aspect ratio (or an aspect ratio corresponding to the state in which the display 610 is maximally expanded) and control the speaker 620 to output the audio data.

According to various embodiments, in operation 1020, the electronic device 200 may identify, through the sensor (e.g., the sensor 630 in FIG. 6), whether at least a part of the bendable section is retracted into the internal space of the housing 210.

According to various embodiments, the electronic device 200 may output the content (operation 1010) in response to the identification of the state in which at least a part of the bendable section is not retracted into the internal space of the housing 210 (No in operation 1020).

According to various embodiments, in operation 1030, the electronic device 200 may display the partial area of the image including the object on the basis of the degree to which the bendable section is retracted in respect to the identification of the state in which at least a part of the bendable section is retracted into the internal space of the housing 210 (YES in operation 1020).

According to various embodiments, a partial area of the image may include an area in which the object accounts for a predetermined ratio or more. For example, a partial area of the image may mean an area including the object. The electronic device 200 may determine a size (or an aspect ratio) of the partial area of the image on the basis of the degree to which at least a part of the bendable section is retracted into the internal space of the housing 210.

According to the embodiment, the memory (e.g., the memory 130 in FIG. 1) may store mapping data made by mapping the degree to which at least a part of the bendable section is retracted into the internal space of the housing 210 and the size of the screen displayed on the display 610. Referring to the mapping data, the electronic device 200 may identify the size (or the aspect ratio) of the partial area of the image corresponding to the degree to which at least a part of the bendable section is retracted into the internal space of the housing 210.

According to the embodiment, the size of the screen displayed on the display 610 may vary depending on the degree to which at least a part of the bendable section is retracted into the internal space of the housing 210. The size of the screen displayed on the display 610 may decrease as the degree to which at least a part of the bendable section is retracted into the internal space of the housing 210 increases. For example, a horizontal length of the screen displayed on the display 610 may decrease as the degree to which at least a part of the bendable section is retracted into the internal space of the housing 210 increases. On the contrary, the size of the screen displayed on the display 610 may increase as the degree to which at least a part of the bendable section is retracted into the internal space of the housing 210 decreases. For example, the horizontal length of the screen displayed on the display 610 may increase as the degree to which at least a part of the bendable section is retracted into the internal space of the housing 210 decreases.

According to various embodiments, the electronic device 200 may determine a size of a partial area of an image so that the size of the partial area of the image is substantially equal to the size of the screen that varies depending on the degree to which at least a part of the bendable section is retracted into the internal space of the housing 210. The electronic device 200 may crop the partial area of the image on the basis of the determined size and control the display 610 to display the cropped image. The cropped image may be a partial area of an image including an object.

According to various embodiments, in operation 1040, the electronic device 200 may adjust the output of at least some of the audio data on the basis of the degree to which the bendable section is retracted.

According to various embodiments, the audio data may include the plurality of sounds, and the plurality of sounds may include sounds corresponding to the objects, and sounds corresponding to the background. The electronic device 200 may divide the audio data into the plurality of sounds in various ways. The electronic device 200 may control the speaker 620 to output the sound corresponding to the object included in the partial area of the image.

According to various embodiments, at least some of the audio data, which are to be subjected to the output adjustment, may include at least one of the sound corresponding to the object that is not displayed on the screen and the sound corresponding to the background. The electronic device 200 may output the sound corresponding to the object without outputting at least some of the audio data.

According to various embodiments, on the basis of the degree to which at least a part of the bendable section is retracted into the internal space of the housing 210, the electronic device 200 may adjust magnitudes of at least some of the audio data to be outputted (e.g., the other sounds excluding the sounds corresponding to the objects among the audio data). According to the embodiment, the electronic device 200 may allow the other sounds excluding the sounds corresponding to the objects among the audio data to be outputted to be small in magnitude than the sounds corresponding to the objects in response to the detection, by the sensor 630, of the change from the second state to the first state. On the basis of the degree to which at least a part of the bendable section is retracted into the internal space of the housing 210, the electronic device 200 may determine the magnitudes of the other sounds excluding the sounds corresponding to the objects among the audio data. For example, the electronic device 200 may further decrease the magnitudes of the other sounds excluding the sounds corresponding to the objects among the audio data as the degree to which at least a part of the bendable section is retracted into the internal space of the housing 210 increases. The electronic device 200 may maintain the magnitude of the sound corresponding to the object while muting the other sounds in response to the state in which the electronic device 200 completely switches to the first state (e.g., the state in which the display 610 cannot be contracted any further).

Figure 11:
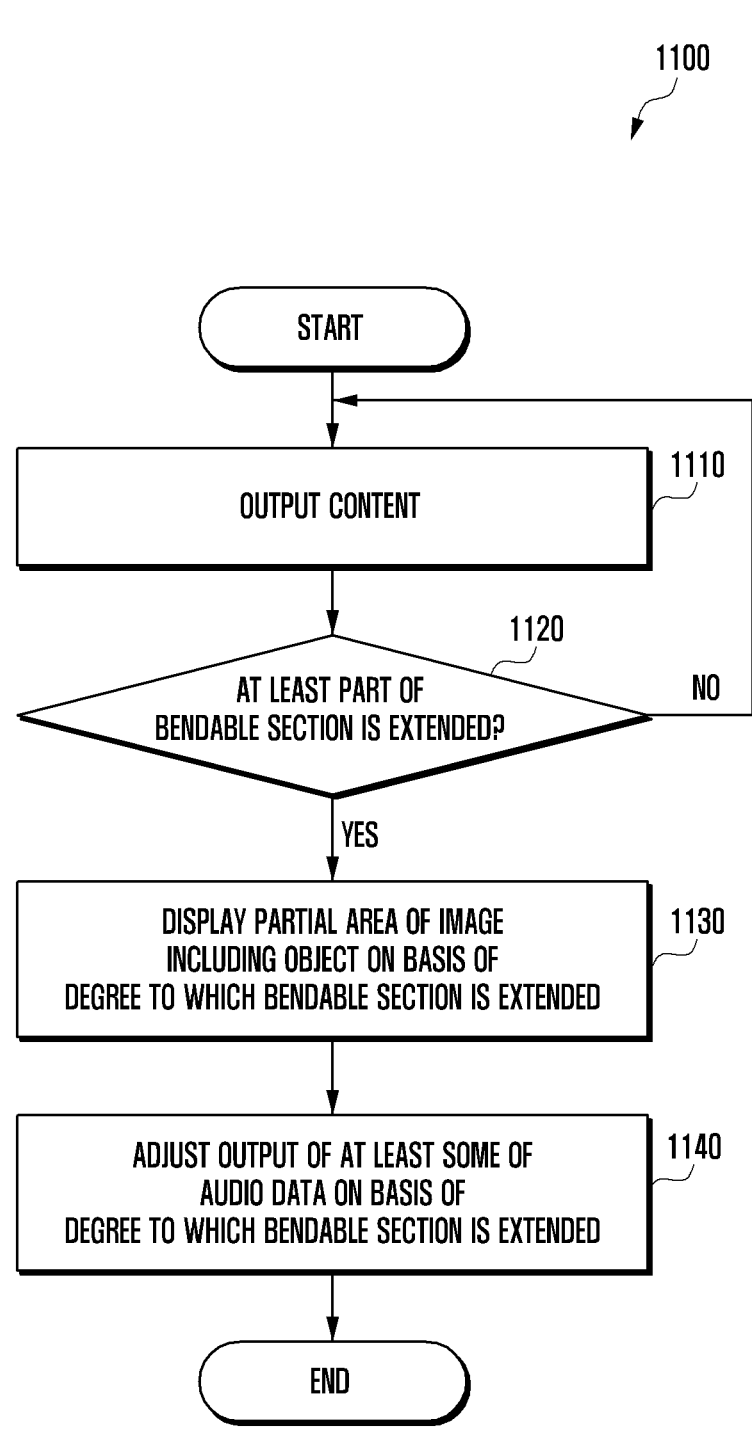
FIG. 11 is an operational flowchart illustrating a method of operating the electronic device according to an embodiment of the disclosure.

FIG. 11 is an operational flowchart illustrating a method 1100 of operating the electronic device according to an embodiment of the disclosure.

According to various embodiments, in operation 1110, the electronic device (e.g., the electronic device 200 in FIG. 6) may output the content.

According to various embodiments, in case that the content is implemented as videos, the content may include a plurality of images and audio data. One or more images of the plurality of images may include objects. The audio data may be defined as an assembly of a plurality of sounds. The plurality of sounds may include sounds respectively corresponding to one or more objects, and/or sounds corresponding to the background.

According to various embodiments, the electronic device 200 may control the display (e.g., the display 610 in FIG. 6) and/or the speaker (e.g., the speaker 620 in FIG. 6) to output the content including images including one or more objects and audio data.

According to the embodiment, in the state in which the display 610 is maximally expanded by the slide-out of the sliding plate 220 of the electronic device 200 (or the state in which the display 610 cannot be expanded any further), the electronic device 200 may control the display 610 to display the content with an original aspect ratio (or an aspect ratio corresponding to the state in which the display 610 is maximally expanded) and control the speaker 620 to output the audio data.

According to various embodiments, in operation 1120, the electronic device 200 may identify, through the sensor (e.g., the sensor 630 in FIG. 6), whether at least a part of the bendable section is extended to the external space of the housing 210.

According to various embodiments, the electronic device 200 may output the content (operation 1110) in response to the identification of the state in which at least a part of the bendable section is not extended to the external space of the housing 210 (No in operation 1120).

According to various embodiments, in operation 1130, the electronic device 200 may display the partial area of the image including the object on the basis of the degree to which the bendable section is extended in respect to the identification of the state in which at least a part of the bendable section is extended to the external space of the housing 210 (YES in operation 1120).

According to various embodiments, a partial area of the image may include an area in which the object accounts for a predetermined ratio or more. For example, a partial area of the image may mean an area including the object. The electronic device 200 may identify, through the sensor 630, a degree to which at least a part of the bendable section is extended to an external space of the housing 210. The electronic device 200 may determine a size (or an aspect ratio) of a partial area of the image on the basis of the degree to which at least a part of the bendable section is extended to the external space of the housing 210. Referring to the mapping data stored in the memory 130, the electronic device 200 may identify the size (or the aspect ratio) of the partial area of the image corresponding to the degree to which at least a part of the bendable section is extended to the external space of the housing 210. For example, the electronic device 200 may increase the size of the partial area as the degree to which at least a part of the bendable section is extended to the external space of the housing 210 increases.

According to various embodiments, in operation 1140, the electronic device 200 may adjust the output of at least some of the audio data on the basis of the degree to which at least a part of the bendable section is extended to the external space of the housing 210.

According to various embodiments, the audio data may include the plurality of sounds, and the plurality of sounds may include sounds corresponding to the objects, and sounds corresponding to the background. The electronic device 200 may divide the audio data into the plurality of sounds in various ways. The electronic device 200 may control the speaker 620 to output the sound corresponding to the object included in the partial area of the image.

According to various embodiments, at least some of the audio data, which are to be subjected to the output adjustment, may include at least one of the sound corresponding to the object that is not displayed on the screen and the sound corresponding to the background. The electronic device 200 may output the sound corresponding to the object without outputting at least some of the audio data.

According to various embodiments, on the basis of the degree to which at least a part of the bendable section is extended to the external space of the housing 210, the electronic device 200 may adjust magnitudes of at least some of the audio data to be outputted (e.g., the other sounds excluding the sounds corresponding to the objects among the audio data). According to the embodiment, the electronic device 200 may determine the magnitudes of the other sounds excluding the sounds corresponding to the objects among the audio data on the basis of the degree to which at least a part of the bendable section is extended to the external space of the housing 210 in response to the detection of the state in which the change from the first state to the second state is detected by the sensor 630. For example, the electronic device 200 may increase the magnitudes of the other sounds excluding the sounds corresponding to the objects among the audio data as the degree to which at least a part of the bendable section is extended to the external space of the housing 210 increases. The electronic device 200 may output the plurality of sounds included in the audio data in response to the state in which the electronic device 200 completely switches to the second state (e.g., the state in which the display 610 cannot be expanded any further).

The electronic device (e.g., the electronic device 200 in FIG. 2) according to various embodiments may include: the housing (e.g., the housing 210 in FIG. 2); the flexible display (e.g., the display 610 in FIG. 6) including the sliding plate (e.g., the sliding plate 220 in FIG. 2) capable of being slid out of the housing 210, and the bendable section (the bendable section ② in FIG. 3) capable of being extended from the internal space of the housing 210 coupled to the sliding plate 220 while overlapping the sliding plate 220; the speaker (e.g., the speaker 620 in FIG. 6); the sensor (e.g., the sensor 630 in FIG. 6) configured to detect the first state in which at least a part of the bendable section is retracted into the internal space of the housing 210 by slide-in of the sliding plate 220 or the second state in which at least a part of the bendable section is extended to an external space of the housing 210 by slide-out of the sliding plate 220; and the processor (e.g., the processor 640 in FIG. 6) operatively connected to the at least one sensor 630, in which the processor 640 may be configured to control the flexible display 610 and the speaker 620 to output content including the images including one or more objects (e.g., the objects 703, 705, and 707 in FIG. 7A) and the audio data (e.g., the audio data 710 in FIG. 7A), in which the processor 640 may be configured to control the flexible display 610 to display at least a part of the image including the objects 703, 705, and 707 on the basis of a degree to which at least a part of the bendable section is retracted into the internal space of the housing 210 in response to detection of a state in which the first state is detected by the sensor 630, and in which the processor 640 may be configured to adjust the output of at least some of the audio data 710 on the basis of the degree to which at least a part of the bendable section is retracted into the internal space of the housing 210.

In the electronic device according to various embodiments, at least some of the audio data 710 may include the sound 715 corresponding to the object 703 included in at least a part of the image, the processor 640 may be configured to distinguish the sound 715 corresponding to the object 703 among the audio data 710 and the other sounds 711, 713, and 717 excluding the sound 715 corresponding to the object 703, and the processor 640 may be configured to control the outputs of the other sounds 711, 713, and 717 on the basis of the degree to which at least a part of the bendable section is retracted into the internal space of the housing 210.

In the electronic device 200 according to various embodiments, the processor 640 may be configured not to output the other sounds 711, 713, and 717 in the first state.

In the electronic device 200 according to various embodiments, the processor 640 may be configured to output the sound 715 corresponding to the object so that the sound 715 corresponding to the object is large in magnitude than the other sounds 711, 713, and 717.

In the electronic device 200 according to various embodiments, the processor 640 may be configured to decrease the magnitudes of the other sounds 711, 713, and 717 on the basis of the degree to which at least a part of the bendable section is retracted into the internal space of the housing 210.

In the electronic device 200 according to various embodiments, the processor 640 may be configured to determine the magnitudes of the other sounds 711, 713, and 717 on the basis of the degree to which at least a part of the bendable section is retracted into the internal space of the housing 210.

In the electronic device 200 according to various embodiments, the processor 640 may be configured to distinguish the sound 715 corresponding to the object 703 among the audio data 710 and the other sounds 711, 713, and 717 excluding the sound 715 corresponding to the object 703, and the processor 640 may be configured to control the outputs of the other sounds 711, 713, and 717 on the basis of the size of at least a part of the flexible display 610 exposed in the first state.

In the electronic device 200 according to various embodiments, the processor 640 may be configured to distinguish the sound 715 corresponding to the object 703 among the audio data 710 and the other sounds 711, 713, and 717 excluding the sound 715 corresponding to the object 703 in response to reception of a request for playing the content.

In the electronic device 200 according to various embodiments, the processor 640 may be configured to store, in the memory (e.g., the memory 130 in FIG. 1), the data made by mapping information on the sound 715 corresponding to the one or more objects 703 included in the image and the one or more objects 703 included in the content in response to production or reception of the content.

In the electronic device 200 according to various embodiments, the processor 640 may be configured to determine properties of at least a part of an image to be displayed on the flexible display 610 on the basis of the degree to which at least a part of the bendable section is retracted into the internal space of the housing 210.

In the electronic device 200 according to various embodiments, the processor 640 may be configured to select at least a part of the image so that the object 703 is included.

In the electronic device 200 according to various embodiments, properties of at least a part of the image may include a size of at least a part of the image and a position of at least a part of the image.

A method of operating the electronic device 200 according to various embodiments may include: outputting the content including images including one or more objects 703, 705, and 707 and the audio data 710; displaying at least a part of the image including the objects 703, 705, and 707 on the basis of the degree to which at least a part of the bendable section is retracted into the internal space of the housing 210 in response to a state in which the change from the second state to the first state is detected by the sensor 630 that detects the first state in which at least a part of the bendable section of the display 610 is retracted into the internal space of the housing 210 or the second state in which at least a part of the bendable section is extended to the external space of the housing 210; and adjusting the output of at least some of the audio data 710 on the basis of the degree to which at least a part of the bendable section is retracted into the internal space of the housing 210.

In the method of operating the electronic device according to various embodiments, at least some of the audio data 710 may include the sound 715 corresponding to the object 703 included in at least a part of the image, and the method of operating the electronic device 200 may further include: distinguishing the sound 715 corresponding to the object 703 among the audio data 710 and the other sounds 711, 713, and 717 excluding the sound 715 corresponding to the object 703; and controlling the outputs of the other sounds 711, 713, and 717 on the basis of the degree to which at least a part of the bendable section is retracted into the internal space of the housing 210.

In the method of operating the electronic device 200 according to various embodiments, the adjusting of the outputs of the other sounds 711, 713, and 717 may not output the other sounds 711, 713, and 717 in the first state.

In the method of operating the electronic device 200 according to various embodiments, the adjusting of the outputs of the other sounds 711, 713, and 717 may include decreasing the magnitudes of the other sounds 711, 713, and 717 on the basis of the degree to which at least a part of the bendable section is retracted into the internal space of the housing 210.

The method of operating the electronic device 200 according to various embodiments may further include: distinguishing the sound 715 corresponding to the object 703 among the audio data 710 and the other sounds 711, 713, and 717 excluding the sound 715 corresponding to the object 703; controlling the outputs of the other sounds 711, 713, and 717 on the basis of the size of at least a part of the flexible display 610 exposed in the first state.

The method of operating the electronic device 200 according to various embodiments may further include determining properties of at least a part of an image to be displayed on the flexible display 610 on the basis of the degree to which at least a part of the bendable section is retracted into the internal space of the housing 210.

In the method of operating the electronic device 200 according to various embodiments, properties of at least a part of the image may include a size of at least a part of the image and a position of at least a part of the image that is occupied by at least a part of the image on the image.

The method of operating the electronic device 200 according to various embodiments may further include displaying the entire content and outputting the audio data 710 in response to the detection of the change from the first state to the second state.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing;
a flexible display comprising:
  a sliding plate capable of sliding out of the housing, and
  a bendable section extendable from an internal space of the housing coupled to the sliding plate while overlapping the sliding plate;
a speaker;
a sensor configured to detect a first state in which at least a part of the bendable section is retracted into the internal space of the housing by slide-in of the sliding plate or a second state in which at least a part of the bendable section is extended to an external space of the housing by slide-out of the sliding plate;
memory storing instructions; and
at least one processor operatively connected to the sensor,
wherein the instructions, when executed by the at least one processor, cause the electronic device to:
  control the flexible display and the speaker to output content including an image including a plurality of objects and audio data, and
  in a case that at least part of the bendable section is retracted into the internal space of the housing:
    identify at least one object that outputs sound among the plurality of objects;
    based on an amount of retraction of the bendable section, determine a region of the image to be displayed from the image, wherein the region of the image includes the at least one object, and
    control the flexible display to display at least the region of the image including the at least one object.

2. The electronic device of claim 1,
wherein the audio data includes a first sound corresponding to the at least one object and a background sound,
wherein the instructions, when executed by the at least one processor, further cause the electronic device to:
  decrease, while the region of the image is displayed, a volume of the background sound, and
wherein the decreased volume of the background sound is based on an amount of retraction of the bendable section.

3. The electronic device of claim 2,
wherein the audio data comprises the first sound corresponding to the at least one object included in the region of the image, and
wherein the instructions, when executed by the at least one processor, further cause the electronic device to:

distinguish the first sound corresponding to the at least one object among the audio data from other sounds excluding the first sound corresponding to the at least one object, and control an output of the other sounds based on a degree to which at least a part of the bendable section is retracted into the internal space of the housing.

4. The electronic device of claim 3, wherein the instructions, when executed by the at least one processor, further cause the electronic device to:

refrain from outputting the other sounds while the electronic device is in the first state.

5. The electronic device of claim 3, wherein the instructions, when executed by the at least one processor, further cause the electronic device to:

output the first sound corresponding to the at least one object so that the first sound corresponding to the at least one object is larger in magnitude than the other sounds.

6. The electronic device of claim 3, wherein the instructions, when executed by the at least one processor, further cause the electronic device to:

decrease a magnitude of the other sounds based on a degree to which the at least a part of the bendable section is retracted into the internal space of the housing.

7. The electronic device of claim 3, wherein the instructions, when executed by the at least one processor, further cause the electronic device to:

distinguish the first sound corresponding to the at least one object among the audio data from the other sounds excluding the first sound corresponding to the at least one object, and control an output of the other sounds based on a size of at least a part of the flexible display exposed in the first state.

8. The electronic device of claim 2, wherein the instructions, when executed by the at least one processor, further cause the electronic device to:

store, in the memory, data made by mapping information on sounds corresponding to the plurality of objects included in the image and the plurality of objects included in the content in response to production or reception of the content.

9. A method performed by an electronic device, the method comprising:

outputting content including an image including a plurality of objects and audio data;

based on at least part of a bendable section of a flexible display being retracted into an internal space of a housing of the electronic device:

identifying at least one object that outputs sound among the plurality of objects, based on an amount of retraction of the bendable section, determining a region of the image to be displayed from the image, wherein the region of the image includes the at least one object, and displaying the region of the image including the at least one object.

10. The method of claim 9, wherein the audio data includes a first sound corresponding to the at least one object and a background sound, wherein the method further comprises:

decreasing, while an extracted at least part of the image is displayed, a volume of the background sound, and wherein the decreased volume of the background sound is based on the amount of retraction of the bendable section.

11. The method of claim 10, wherein the audio data comprises the first sound corresponding to the at least one object included in the region of the image, and wherein the method further comprises:

distinguishing the first sound corresponding to the at least one object among the audio data from other sounds excluding the first sound corresponding to the at least one object, and controlling an output of the other sounds based on a degree to which the at least part of the bendable section is retracted into the internal space of the housing.

12. The method of claim 11, further comprising:

refraining from outputting the other sounds while the electronic device is in a first state in which at least a part of the bendable section is retracted into the internal space of the housing.

13. The method of claim 10, wherein the determining the region of the image comprises determining the region of the image such that the region of the image includes the at least one object outputting the first sound.

* * * * *